United States Patent
Amano et al.

(10) Patent No.: US 10,693,905 B2
(45) Date of Patent: Jun. 23, 2020

(54) INVALIDITY DETECTION ELECTRONIC CONTROL UNIT, IN-VEHICLE NETWORK SYSTEM, AND COMMUNICATION METHOD

(71) Applicant: Panasonic Intellectual Property Corporation of America, Torrance, CA (US)

(72) Inventors: Hiroshi Amano, Osaka (JP); Toshihisa Nakano, Osaka (JP); Natsume Matsuzaki, Osaka (JP); Tomoyuki Haga, Nara (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 217 days.

(21) Appl. No.: 15/879,962

(22) Filed: Jan. 25, 2018

(65) Prior Publication Data
US 2018/0152472 A1    May 31, 2018

Related U.S. Application Data

(63) Continuation of application No. PCT/JP2016/004008, filed on Sep. 2, 2016.

(30) Foreign Application Priority Data

Sep. 29, 2015   (JP) ................... 2015-192327
Jun. 8, 2016   (JP) ................... 2016-114879

(51) Int. Cl.
*H04L 29/06*   (2006.01)
*H04L 12/40*   (2006.01)
(Continued)

(52) U.S. Cl.
CPC ........ *H04L 63/1441* (2013.01); *B60R 16/023* (2013.01); *H04L 12/40* (2013.01);
(Continued)

(58) Field of Classification Search
CPC ..... H04L 63/1441; H04L 63/14; H04L 12/40; H04L 12/40176; H04L 2012/40215;
(Continued)

(56) References Cited

U.S. PATENT DOCUMENTS 4,092,493 A * 5/1978 Rabiner .................. G10L 15/00
                                                          704/237
4,852,043 A * 7/1989 Guest .................. G06F 13/4045
                                                          710/300
(Continued)

FOREIGN PATENT DOCUMENTS

JP    2004-156377     6/2004
JP    2012-204936 A  10/2012
(Continued)

OTHER PUBLICATIONS

International Search Report of PCT application No. PCT/JP2016/004008 dated Nov. 8, 2016.
(Continued)

*Primary Examiner* — Behrang Badii
*Assistant Examiner* — Daniel L Greene
(74) *Attorney, Agent, or Firm* — Greenblum & Bernstein, P.L.C.

(57) ABSTRACT

An invalidity detection electronic control unit connected to a bus used by a plurality of electronic control units (ECUs) to communicate with one another in accordance with controller area network (CAN) protocol includes a receiving unit that receives a frame for which transmission is started and a transmitting unit that transmits an error frame on the bus before a tail end of the frame is transmitted if the frame
(Continued)

received by the receiving unit meets a predetermined condition indicating invalidity and transmits a normal frame that conforms to the CAN protocol after the error frame is transmitted. Even when a reception error counter of the ECU connected to the bus is incremented due to the impact of the error frame, the reception error counter is decremented by the normal frame.

13 Claims, 11 Drawing Sheets

(51) Int. Cl.
*H04W 12/12* (2009.01)
*B60R 16/023* (2006.01)

(52) U.S. Cl.
CPC ........ *H04L 12/40176* (2013.01); *H04L 63/14* (2013.01); *H04W 12/1202* (2019.01); *H04L 2012/40215* (2013.01); *H04L 2012/40273* (2013.01)

(58) Field of Classification Search
CPC ..... H04L 2012/40273; H04W 12/1202; B60R 16/023
See application file for complete search history.

(56) References Cited

U.S. PATENT DOCUMENTS

| | | | |
|---|---|---|---|
| 5,224,096 A * | 6/1993 | Onishi | H04L 12/433 370/452 |
| 2005/0190037 A1 | 9/2005 | Shitan et al. | |
| 2006/0262687 A1 * | 11/2006 | Minemura | G11B 7/00458 369/53.11 |
| 2012/0243426 A1 | 9/2012 | Matsui et al. | |
| 2013/0322461 A1 * | 12/2013 | Poulsen | H04J 3/02 370/458 |
| 2013/0322462 A1 * | 12/2013 | Poulsen | H04J 3/06 370/458 |
| 2014/0310530 A1 * | 10/2014 | Oguma | H04L 9/3242 713/181 |
| 2015/0066239 A1 * | 3/2015 | Mabuchi | H04L 63/1408 701/1 |
| 2015/0082308 A1 | 3/2015 | Kiess et al. | |
| 2016/0359893 A1 * | 12/2016 | Kishikawa | H04L 67/12 |
| 2017/0013006 A1 * | 1/2017 | Ujiie | H04L 12/6418 |

FOREIGN PATENT DOCUMENTS

| | | |
|---|---|---|
| JP | 2014-236248 | 12/2014 |
| JP | 2015-056182 A | 3/2015 |

OTHER PUBLICATIONS

Masato Hata et al, "How to Stop Unauthorized Transmission in Controller Area Network, Proceedings of CSS2011 Computer Security Symposium 2011, Joint event: Anti Malware Engineering Workshop 2011 Information Processing Society of Japan Symposium Series(Partial English Translation)", Japan, Computer Security Group, Information Processing Society of Japan, Oct. 12, 2011(Oct. 12, 2011), vol. 2011, No. 3, pp. 624-629.

* cited by examiner

FIG. 4

|  | UNAUTHORIZED ECU | INVALIDITY DETECTION ECU | ECU (AUTHORIZED ECU) |
|---|---|---|---|
| TRANSMISSION ERROR COUNTER | +8 | — | — |
| RECEPTION ERROR COUNTER | — | +9 (1+8) | +1 |

INVALIDITY DETECTION ELECTRONIC CONTROL UNIT, IN-VEHICLE NETWORK SYSTEM, AND COMMUNICATION METHOD

BACKGROUND

1. Technical Field

The present disclosure relates to an invalidity detection electronic control unit that, for example, detects an unauthorized frame in a network in which electronic control units mounted in a vehicle performs communication with one another.

2. Description of the Related Art

In recent years, a system of an automobile includes a plurality of devices called electronic control units (ECUs). A network connecting the ECUs with one another is called an in-vehicle network. There are many standards for the in-vehicle network. Among the standards, one of the most mainstream in-vehicle networks is a standard called controller area network (CAN) defined by ISO 11898-1. In addition to being used for automobiles, CAN is used as a control network in systems of various fields, such as trains, industrial machinery, robots, and medical equipment.

To eliminate the threat of an unauthorized ECU that impersonates an authorized ECU and transmits an unauthorized frame (an unauthorized data frame) in the CAN network, the following technique has been developed (a technique for preventing transmission of an unauthorized frame). That is, upon detecting an unauthorized frame, an ECU having an invalidity detection function and connected to a bus which is a CAN communication path (a CAN bus) (an invalidity detection ECU) transmits an error frame. Thus, the ECU invalidates the unauthorized frame (refer to, for example, Japanese Unexamined Patent Application Publication No. 2014-236248; Manabu Nakano, Tsutomu Matsumoto, Camille Vuillaume, "Automotive Information Security" Nikkei B P, Dec. 27, 2013; and Masato Hata, Masato Tanabe, Katsunari Yoshioka, Tsutomu Matsumoto, "Implementation and Evaluation of a Method for Preventing Unauthorized Data Transmission", IEICE technical report, The Institute of Electronics, Information and Communication Engineers, December 2012).

SUMMARY

In one general aspect, the techniques disclosed here feature an invalidity detection electronic control unit connected to a bus used by a plurality of electronic control units to communicate with one another in accordance with controller area network (CAN) protocol. The invalidity detection electronic control unit includes a receiving unit that receives a frame for which transmission is started and a transmitting unit that transmits an error frame on the bus before a tail end of the frame is transmitted if the frame received by the receiving unit meets a predetermined condition indicating invalidity and transmits a normal frame that conforms to the CAN protocol on the bus after the error frame is transmitted.

According to the present disclosure, an adverse effect of transmission of an error frame for invalidating an unauthorized frame on an authorized ECU can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an example of an increment of an error counter due to an error frame for invalidating an unauthorized frame;

DETAILED DESCRIPTION

Figure 1:
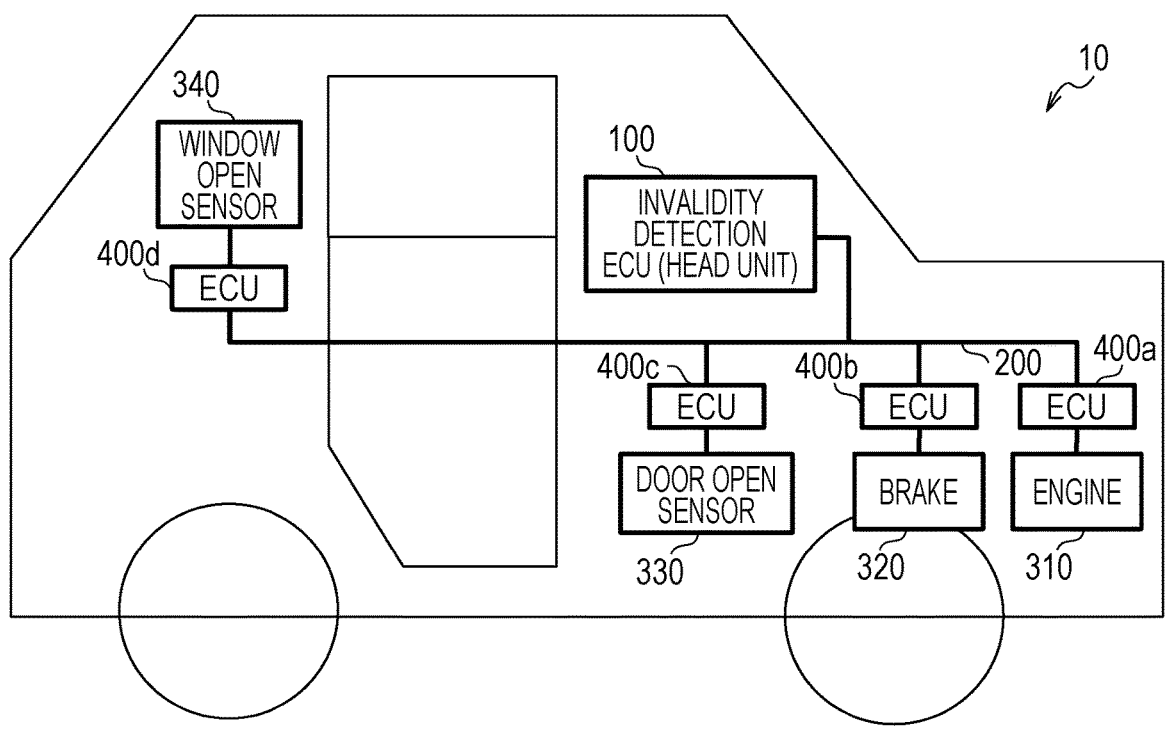
FIG. 1 is a diagram illustrating the overall configuration of the in-vehicle network system according to a first embodiment.

Underlying Knowledge Forming Basis of the Present Disclosure

When an error frame is transmitted to invalidate an unauthorized frame, a reception error counter of an authorized ECU connected to the CAN bus is incremented. The increment of the reception error counter of the ECU may cause the ECU to enter a passive mode in which rapid transmission of a data frame or the like is restricted.

The present disclosure provides an invalidity detection electronic control unit (invalidity detection ECU) capable of reducing an adverse effect of detecting an unauthorized frame and transmitting an error frame in order to invalidate the unauthorized frame on an authorized ECU. In addition, the present disclosure provides an in-vehicle network system and a communication method for use in the in-vehicle network system capable of reducing an adverse effect of transmission of an error frame in order to invalidate an unauthorized frame on an authorized ECU.

According to an aspect of the present disclosure, an invalidity detection electronic control unit (invalidity detection ECU) connected to a bus used by a plurality of electronic control units to communicate with one another in accordance with controller area network (CAN) protocol is provided. The invalidity detection electronic control unit includes a receiving unit that receives a frame for which transmission is started and a transmitting unit that transmits an error frame on the bus before a tail end of the frame is transmitted if the frame received by the receiving unit meets a predetermined condition indicating invalidity and transmits a normal frame that conforms to the CAN protocol on the bus after the error frame is transmitted. In this manner, after the error frame is transmitted to invalidate an unauthorized frame, the normal frame is transmitted. Upon receiving the normal frame, the reception error counter of an authorized ECU connected to the CAN bus is decremented. Accordingly, an adverse effect of transmission of an error frame for invalidating an unauthorized frame on an authorized ECU can be reduced.

In addition, the invalidity detection electronic control unit may include a communication interface connected to the bus, a CAN controller that is connected to the communication interface and that controls communication on the bus in accordance with the CAN protocol, and a CPU that controls the CAN controller to realize the receiving unit and the transmitting unit. Thus, the CPU controls the CAN controller by executing the control program so as to accomplish transmission of a normal frame to the CAN bus subsequent to the transmission of the error frame for invalidating the unauthorized frame. As a result, implementation of reduction of an adverse effect of the transmission of an error frame for invalidating an unauthorized frame on an authorized ECU can be relatively easily facilitated.

In addition, when the bus enters an idle state for the first time after the transmission of the error frame, the transmitting unit may transmit the normal frame. Thus, by transmitting an error frame for invalidating an unauthorized frame, the state in which the reception error counter of the authorized ECU has incremented can be promptly restored to the state before the transmission of the error frame.

In addition, the transmitting unit may transmit normal frames equal in number to the number of the transmitted error frames. Thus, the reception error counter can be decremented by an increment of the reception error counter of the authorized ECU due to the error frame.

In addition, the transmitting unit may transmit a normal frame if the transmission of the normal frame fails. Thus, even when the transmission of the normal frame after the transmission of the error frame fails due to, for example, communication arbitration, a normal frame is transmitted again. Accordingly, the probability of decrementing the reception error counter of the authorized ECU that has been incremented due to the transmission of the error frame can be increased.

In addition, the transmitting unit may transmit normal frames which are more in number than a value obtained by subtracting, from the number of the transmitted error frames, the number of normal frames that do not meet the predetermined condition and that are received from the bus after the error frames are transmitted. Thus, the sum of proper frames (normal frames that are not unauthorized frames) that have flowed on the bus after transmission of the error frame and the transmitted normal frame is the number of the error frames or more. As a result, the probability of decrementing the reception error counter of the authorized ECU that has been incremented due to the transmission of the error frame to the value before the transmission of the error frame can be increased.

In addition, if the transmission of the normal frame fails, the transmitting unit may transmit a normal frame having an ID field indicating an ID that is smaller than an ID indicated by an ID field of the normal frame. In this manner, by transmitting a normal data frame using an ID (a message ID) having a relatively low priority first, the impact on communication performed by another ECU can be eliminated. Thereafter, if the transmission of a normal data frame fails, the message ID used for a normal frame (a normal data frame) is changed to a message ID having a higher priority, for example, unconditionally or under a certain condition. Thus, the normal frame negligibly lose communication arbitration. As a result, the probability of decrementing the reception error counter of an authorized ECU can be increased.

In addition, the normal frame transmitted by the transmitting unit after an error frame is transmitted may be a data frame having a data field with a length of zero. In this manner, the bus occupation time of the transmitted normal frame (the normal data frame) can be made short and, thus, the impact on the bus bandwidth can be eliminated.

In addition, an ID indicated by an ID field of the normal frame transmitted by the transmitting unit after an error frame is transmitted may be an ID for which a process to be performed is not defined by any one of the electronic control units connected to the bus other than the invalidity detection electronic control unit after the electronic control unit identifies the ID. Thus, an unwanted operation performed by an authorized ECU that has received the normal data frame can be prevented.

In addition, if the transmitting unit receives, from the bus, a normal frame that does not meet the predetermined condition after the transmission of the error frame and before the transmission of the normal frame, the transmitting unit may stop transmitting the normal frame. Thus, when the reception error counter of the authorized ECU is decremented due to a frame that is not an unauthorized frame and that flows on the bus after the transmission of the error frame, the transmitting unit can stop transmitting an unnecessary normal frame, so that the impact on the bus bandwidth can be reduced.

In addition, the invalidity detection electronic control unit may be connected to a plurality of buses, and the invalidity detection electronic control unit may have a function of forwarding a frame received from one of the buses to the other. If the received frame meets the predetermined condition, the invalidity detection electronic control unit may stop forwarding the frame. If a frame received by the receiving unit meets the predetermined condition, the transmitting unit may transmit an error frame on the bus from which the frame has been received before the tail end of the frame is transmitted and transmit the normal frame on the bus after the error frame is transmitted. In this manner, by transmitting the error frame for invalidating the unauthorized frame and the normal data frame for inhibiting a decrement of the reception error counter to only the bus for which the detected unauthorized frame has been detected, the invalidity detection electronic control unit can eliminate the impact of the unauthorized frame detected on one of the buses on another bus.

According to another aspect of the present disclosure, an in-vehicle network system is provided. The in-vehicle network system includes a plurality of electronic control units that communicate with one another via a bus in accordance with a controller area network (CAN) protocol and an invalidity detection electronic control unit connected to the bus. The invalidity detection electronic control unit includes a receiving unit that receives a frame for which transmission is started and a transmitting unit that transmits an error frame on the bus before a tail end of the frame is transmitted if the frame received by the receiving unit meets a predetermined condition indicating invalidity and transmits a normal frame that conforms to the CAN protocol on the bus after the error frame is transmitted. Each of the electronic control units includes a CAN controller including a reception error counter, and the electronic control unit controls communication on the bus in accordance with the CAN protocol and decrements a value of the reception error counter if reception of a normal frame from the bus is successful. In this manner, after the error frame is transmitted from the invalidity detection electronic control unit to invalidate the unauthorized frame, the normal frame is transmitted from the invalidity detection electronic control unit. In an ECU that has received the normal frame, the reception error counter is decremented. Thus, an adverse effect of transmission of an error frame for invalidating an unauthorized frame on an authorized ECU can be reduced.

According to still another aspect of the present disclosure, a communication method for use in an in-vehicle network system including a plurality of electronic control units that communicate with one another via a bus in accordance with a controller area network (CAN) protocol is provided. The method includes receiving a frame for which transmission is started and transmitting an error frame on the bus before a tail end of the frame is transmitted if the received frame meets a predetermined condition indicating invalidity and transmitting a normal frame that conforms to the CAN protocol on the bus after the error frame is transmitted. Thus, an adverse effect of transmission of an error frame for invalidating an unauthorized frame on an authorized ECU can be reduced.

It should be noted that these general or specific embodiments may be implemented as a system, a method, an integrated circuit, a computer program, a computer-readable storage medium, such as a CD-ROM, or any selective combination thereof.

An in-vehicle network system including an invalidity detection ECU according to each of embodiments is described below with reference to the accompanying drawings. Each of the embodiments below describes a specific example of the present disclosure. Accordingly, a value, a constituent element, the positions and the connection form of the constituent elements, steps (processes), and the sequence of steps used in the embodiments are only examples and shall not be construed as limiting the scope of the present disclosure. In addition, among the constituent elements of the embodiments described below, the constituent element that does not appear in an independent claim is described as an optional constituent element. In addition, all of the drawings are schematic and not necessarily to scale.

First Embodiment

As an embodiment of the present disclosure, an in-vehicle network system 10 including a plurality of electronic control units (ECUs) that communicate with one another via a bus is described below with reference to the accompanying drawings.

1.1 Overall Configuration of In-Vehicle Network System

FIG. 1 is a diagram illustrating the overall configuration of the in-vehicle network system 10 according to the first embodiment. The in-vehicle network system 10 is an example of a network communication system that communicates in accordance with the CAN protocol and is a network communication system for use in a vehicle equipped with various devices, such as a control device and a sensor. The in-vehicle network system 10 includes a bus 200, an invalidity detection ECU (a head unit) 100, and nodes each connected to a bus, such as ECUs 400a to 400d connected to various devices. The in-vehicle network system 10 may include a plurality of ECUs (not illustrated in FIG. 1) in addition to the invalidity detection ECU 100 and the ECUs 400a to 400d. Each of the ECUs is a device including digital circuits, such as a processor (a microprocessor) and a memory, an analog circuit, and a communication circuit. Examples of the memory include a ROM and a RAM. The memory can store a control program (a computer program) executed by the processor. For example, the processor operates in accordance with a control program (a computer program) and, thus, the ECU provides various functions. To provide a predetermined function, the computer program is formed by combining a plurality of instruction codes indicating instructions to the processor.

The ECUs 400a to 400d are connected to the bus 200 and are connected to the engine 310, the brake 320, the door open sensor 330, and the window open sensor 340, respectively. Each of the ECUs 400a to 400d acquires the state of a device connected thereto (e.g., the engine 310) and periodically transmits, for example, a frame (a data frame described below) indicating the state onto the network (that is, the bus).

The invalidity detection ECU (the head unit) 100 is a kind of ECU. The invalidity detection ECU 100 has a function of receiving frames transmitted from the ECUs 400a to 400d and displaying a variety of states on a display (not illustrated) to present the state to a user. In addition, the invalidity detection ECU 100 has a function of generating a frame indicating a piece of information acquired by the invalidity detection ECU 100 and transmitting the frame to one or more of the ECUs via the bus 200. In addition, the invalidity detection ECU 100 has an invalidity detection function. That is, the invalidity detection ECU 100 determines whether a frame to be transmitted or received is compliant with a rule and, thus, determines whether the frame is an unauthorized frame (that is, the frame is not compliant with the rule). Upon detecting an unauthorized frame, the invalidity detection ECU 100 transmits an error frame. An unauthorized frame can also be said to be a frame that meets a predetermined condition indicating invalidity. Note that the invalidity detection ECU (the head unit) 100 may have functions such as car navigation, music playback, movie playback, web page display, cooperation with a smartphone, and downloading and executing an application program. In the present embodiment, description is given in the following section focusing on the operation related to the invalidity detection function of the invalidity detection ECU 100 (the head unit).

In the in-vehicle network system 10, each of the ECUs transmits and receives frames using the CAN protocol.

Frames defined by the CAN protocol include a data frame, a remote frame, an overload frame, and an error frame.

1.2 CAN Data Transmission

In CAN, the communication path is a bus formed from two wires (e.g., the bus 200 described above), and an ECU connected to the bus is called a node. Each of the nodes connected to the bus transmits and receives a message called a frame. A sending node that transmits a frame transmits a value of "1" called a recessive bit and a value of "0" called a dominant bit by generating a potential difference between the two wires. A state in which the potential difference between the two wires is large is a dominant state, and a state in which the potential difference is small is a recessive state. When transmitting nodes send (transmit) recessive and dominant bits to the bus at the same time, the dominant bit is transmitted preferentially. If the format of the received frame is abnormal, the receiving node transmits a frame called an error frame. An error frame is used to inform the sending node or another receiving node that the frame is abnormal by transmitting 6 successive dominant bits.

In addition, in CAN, there is no identifiers indicating a transmission destination and a transmission source, and the transmitting node attaches an ID called a message ID to each of frames and transmits the frame (that is, sends a signal to the bus), and each of receiving nodes receives only a frame having a predetermined ID (that is, reads the signal from the bus). Furthermore, the CSMA/CA (Carrier Sense Multiple Access/Collision Avoidance) mechanism is employed. If a plurality of nodes transmit frames at the same time, arbitration is performed by using the message IDs so that a frame with a smaller message ID value is transmitted preferentially.

CAN data communication is performed using a data frame. According to the CAN 2.0 standard, data of up to 8 bytes can be transmitted in one frame.

1.3 Data Frame Format

A data frame, which is one type of frame used in a network based on the CAN protocol, is described below.

Figure 2:
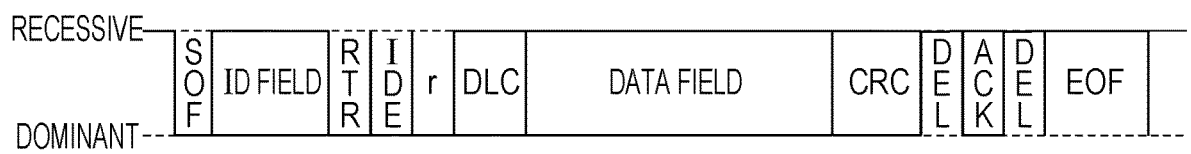
FIG. 2 illustrates the format of a data frame defined by the CAN protocol.

FIG. 2 illustrates the format of the data frame defined by the CAN protocol. The data frame having a standard ID format defined by the CAN protocol is illustrated in FIG. 2. The data frame includes an SOF (Start Of Frame) field, an ID field, an RTR (Remote Transmission Request) field, an IDE (Identifier Extension) field, a reservation bit "r", a DLC (Data Length Code) field, a data field, a CRC (Cyclic Redundancy Check) sequence field, a CRC delimiter field "DEL", an ACK (Acknowledgement) slot field, an ACK delimiter field "DEL", and an EOF (End Of Frame) field.

The SOF field is formed from one dominant bit. When the bus is idle, the state of the bus is recessive. By changing the state of the bus from recessive to dominant using SOF, the notice of start of frame transmission is given.

The ID field is a 11-bit field. The ID field includes an ID (a message ID) that is a value indicating the type of data. In order to perform communication arbitration by using the ID field, the design is such that if a plurality of nodes simultaneously start transmission, a frame having a lower ID value has a higher priority.

RTR is a value for distinguishing a data frame from a remote frame. In data frames, the RTR field is formed from one dominant bit.

Each of IDE and "r" is formed from one dominant bit.

DLC is of 4 bits. DLC indicates the length of the data field. Note that IDE, "r", and DLC are collectively referred to as a "control field".

The data field indicates the data to be transmitted, where the maximum length of the data field is 64 bits. The length can be controlled to 8 to 64 bits (multiple of 8 bits). The specification of data to be transmitted is not defined by the CAN protocol and is defined by the in-vehicle network system 10. Accordingly, the specification of the data depends on, for example, the type of vehicle and the manufacturer (the maker).

The CRC sequence field is a 15-bit field. The CRC sequence is calculated by using the transmitted values of SOF, the ID field, the control field, and the data field.

The CRC delimiter is formed from one recessive bit. The CRC delimiter is a delimiter symbol that indicates termination of the CRC sequence. Note that the CRC sequence field and the CRC delimiter field are collectively referred to as a "CRC field".

The ACK slot field is a 1-bit field. The sending node sets the ACK slot to recessive and transmits data. If a receiving node successfully receives the data up to the CRC sequence, the receiving node sets the ACK slot to dominant and transmits the data. Dominant has priority over recessive. Accordingly, if the ACK slot is dominant after transmission, the sending node can determine that any one of the receiving nodes has successfully received the data.

The ACK delimiter is formed from one recessive bit. The ACK delimiter is a delimiter symbol that indicates termination of ACK.

The EOF is formed from 7 recessive bits. EOF indicates termination of the data frame.

1.4 Error Frame Format

Figure 3:
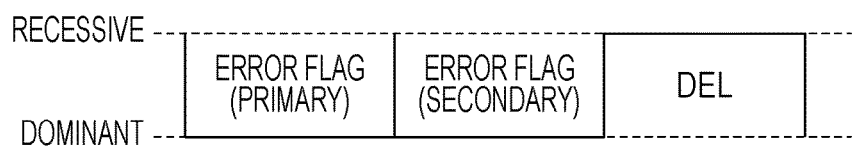
FIG. 3 illustrates the format of an error frame defined by the CAN protocol.

FIG. 3 illustrates the error frame format defined by the CAN protocol. The error frame includes an error flag (primary), an error flag (secondary), and an error delimiter.

The error flag (primary) is used to inform another ECU (node) of the occurrence of an error. The node that has detected the error transmits 6 successive dominant bits to inform other nodes of the occurrence of the error. This transmission violates the bit stuffing rule of the CAN protocol (a rule to inhibit transmission of 6 or more successive bits of the same value), causing other nodes to transmit error frames (secondary).

The error flag (secondary) is formed from 6 successive dominant bits, which are used to inform other nodes of the occurrence of an error. All of the nodes that have received the error flag (primary) and detected the bit stuffing rule violation send an error flag (secondary).

The error delimiter "DEL" is 8 successive recessive bits, which indicates termination of the error frame.

1.5 Error Counter

According to the CAN protocol, each of the ECUs communicating each other on the CAN bus increments the error counter when an error occurs.

When transmission of the error frame on the CAN bus is started, the frame which has been flowing on the bus so far is overwritten (that is, invalidated) by the error frame formed from successive dominant bits having priority over a recessive bit, so that transmission of the frame is interrupted. Upon detecting the transmission error, the ECU (the sending node) that has transmitted the frame flowing on the bus until now increases the transmission error counter in the CAN controller of that ECU by one.

In addition, when an error frame (primary) is transmitted on the CAN bus, an ECU (a receiving node) connected to the CAN bus detects a reception error due to the above-described bit stuffing rule violation. Thus, the ECU transmits an error frame (secondary) and increments the reception error counter in the CAN controller of that ECU by one.

FIG. 4 illustrates an example of an error counter after an unauthorized frame is transmitted on the CAN bus. In this example, the increment value of the error counter of each of the ECUs is illustrated in the following case. That is, an unauthorized ECU connected to the CAN bus transmits an unauthorized frame. Upon detecting the unauthorized frame, the invalidity detection ECU transmits an error frame (primary) to invalidate the unauthorized frame. Thereafter, the authorized ECU (an ECU that is authorized) transmits an error frame (secondary).

CAN does not provide the sender verification mechanism for data frames. When a data frame is transmitted, the data frame is broadcasted to all of the nodes (the ECUs) on the bus. Accordingly, if one of the ECUs connected to the bus is exploited (is controlled) by an attacker, there is a threat that this ECU impersonates another ECU that performs main control and fraudulently controls the device. An example of an unauthorized ECU is the exploited ECU. Note that a faulty ECU or the like may also be an exploited ECU. As described above, the invalidity detection ECU (the head unit) 100 determines whether a frame transmitted by an unauthorized ECU is unauthorized by determining whether the frame meets a rule predetermined by the in-vehicle network system.

In CAN, if the reception error counter in each of the ECUs becomes greater than a predetermined threshold value, the ECU enters a mode called a passive mode in which quick transmission is restricted. In a normal mode, the ECU cannot transmit a data frame until the CAN bus enters the bus idle state, that is, until the end of the ITM (Intermission), which is a 3-bit recessive after the data frame. In contrast, in the passive mode, the ECU cannot transmit a data frame until further receiving an 8-bit recessive after the end of the ITM. Accordingly, quick transmission is restricted.

To avoid the adverse effect of transmission of an error frame for preventing transmission of an unauthorized frame (for invalidating the unauthorized frame), that is, to prevent an authorized ECU from entering a quick transmission restriction mode due to an increment of the reception error counter caused by the transmission of the error frame, the invalidity detection ECU 100 has a function of promptly transmitting a normal frame under certain conditions after transmitting an error frame. An authorized ECU operating in accordance with the CAN protocol decrements the reception error counter by one if the ECU can receive a normal frame (that is, a frame in accordance with the CAN protocol) without a reception error. In this manner, the ECU can be less likely to enter the passive mode.

1.6 Configurations of Invalidity Detection ECU and ECU

Figure 5:
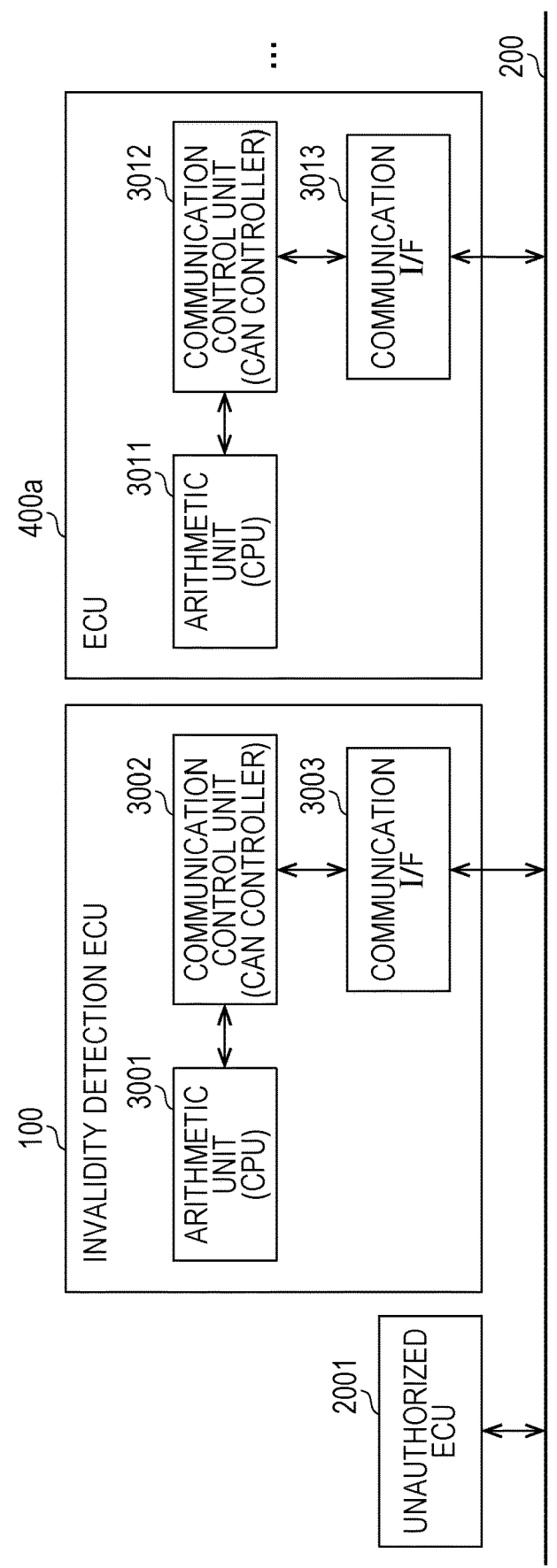
FIG. 5 is a configuration diagram of an invalidity detection ECU and an authorized ECU.

FIG. 5 illustrates an example of the configurations of the invalidity detection ECU (the head unit) 100, the authorized ECU 400a, and the like. For convenience of description, among the ECUs connected to the bus 200 of the in-vehicle network system 10 illustrated in FIG. 1, only the invalidity detection ECU (the head unit) 100, which is an ECU having the invalidity detection function, and the ECU 400a, which is one of the authorized ECUs, are illustrated in the drawing. In FIG. 5, for example, an unauthorized ECU 2001 is additionally illustrated. The unauthorized ECU 2001 transmits an unauthorized data frame because, for example, the ECU 2001 malfunctions or the ECU 2001 is controlled by an attacker.

The unauthorized ECU 2001, the authorized ECU 400a, and the invalidity detection ECU 100 transmit and receive, for example, data frames related to control of an electronic device via the bus 200.

The invalidity detection ECU 100 has a function of transmitting a data frame and an error frame in accordance with the CAN protocol. In addition, the invalidity detection ECU 100 has a function of monitoring the bus 200 and blocking transmission of an unauthorized data frame (that is, invalidating the unauthorized data frame) by using an error frame if an unauthorized data frame is flowing on the bus 200.

As illustrated in FIG. 5, the invalidity detection ECU 100 includes an arithmetic unit 3001, a communication control unit 3002, and a communication interface (communication I/F) 3003. The arithmetic unit 3001 and the communication control unit 3002 are configured so as to communicate with each other either wired or wirelessly. Similarly, the communication control unit 3002 and the communication I/F 3003 are configured so as to communicate with each other either wired or wireless. The communication I/F 3003 is, for example, a CAN transceiver which is a communication circuit connected to the bus 200 (the CAN bus) for transmitting and receiving frames. The communication control unit 3002 is a CAN controller which is a processor that controls communication on the bus 200 and performs processing related to the CAN protocol. The communication control unit 3002 has a function of converting information received via the communication I/F 3003 into data that is readable by the arithmetic unit 3001 and a function of transmitting a data frame or an error frame in accordance with the CAN protocol via the communication I/F 3003 in response to an instruction from the arithmetic unit 3001. In addition, the communication control unit 3002, which is a CAN controller, includes error counters (a transmission error counter and a reception error counter) and performs an operation on the error counters and control relating to the error counter. The arithmetic unit 3001 is formed from a CPU (Central Processing Unit) and a memory. The arithmetic unit 3001 executes a control program stored in the memory by using the CPU so as to control the communication control unit 3002. Thus, the arithmetic unit 3001 provides a variety of functions relating to the processing based on the received frame and generation of a frame to be transmitted.

The ECU 400a (the authorized ECU) has a function of transmitting a data frame and an error frame in accordance with the CAN protocol, a function of transmitting an error frame and incrementing (increasing) the reception error counter if an error in data flowing through the bus 200 is detected, and a function of decrementing (decreasing) the reception error counter if a data frame flowing through the bus 200 is normally received (without a reception error).

As illustrated in FIG. 5, the ECU 400a includes an arithmetic unit 3011, a communication control unit 3012, and a communication interface (communication I/F) 3013 configured so as to communicate with each other either wired or wirelessly. The arithmetic unit 3011, the communication control unit 3012, and the communication I/F 3013 are similar to the arithmetic unit 3001, the communication control unit 3002, and the communication I/F 3003, respectively. The communication control unit 3012 is a CAN controller that includes a reception error counter and controls communication on the bus 200 in accordance with the CAN protocol. When reception of a normal frame from the bus 200 is successful, the communication control unit 3012 decreases the value of the reception error counter. Although not illustrated in FIG. 5, each of the ECUs 400b to 400d has a configuration that is the same as the configuration of the ECU 400a.

1.7 Functional Configurations of Invalidity Detection ECU

Figure 6:
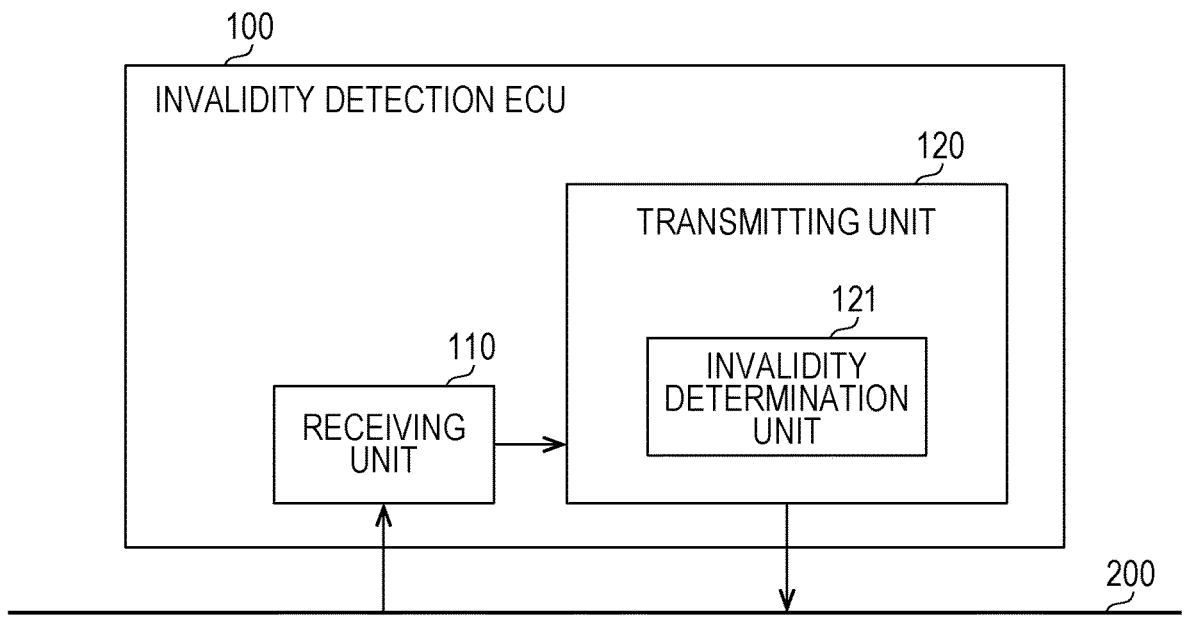
FIG. 6 is a functional block diagram of the invalidity detection ECU.

FIG. 6 is a functional block diagram of the invalidity detection ECU (the head unit) 100.

As illustrated in FIG. 6, the invalidity detection ECU 100 functionally includes a receiving unit 110 and a transmitting unit 120. The transmitting unit 120 includes an invalidity determination unit 121. The functions of the receiving unit 110 and the transmitting unit 120 are provided by the arithmetic unit 3001 which is a CPU that executes a control program. Although not described here, the invalidity detection ECU 100 serving as a head unit exchanges data frames with other authorized ECUs and, thus, can perform various functions of the head unit (for example, car navigation, music playback, movie playback, Web page display, cooperation with a smartphone).

The receiving unit 110 has a function of receiving a frame for which transmission on the bus 200 has been started. The receiving unit 110 reads data relating to a frame received by the communication control unit 3002.

The invalidity determination unit 121 has a function of detecting, from the data in the data frame received by the receiving unit 110, whether the data frame flowing through the bus 200 is an unauthorized frame. That is, the invalidity determination unit 121 determines whether the data frame conforms to a predetermined determination rule (determines whether the data frame is unauthorized). Any determination rule may be used if it is predetermined for the in-vehicle network system 10. An example of the determination rule is a rule that the frame is a frame having a message ID specified in a predetermined message ID list. Another example of the determination rule is a rule that the time interval at which a data frame having a message ID denoting periodical transmission is received is within a predetermined proper period plus or minus a predetermined tolerance.

The transmitting unit 120 has, for example, a function of transmitting an error frame if an unauthorized data frame is detected by the invalidity determination unit 121 and a function of promptly transmitting a normal frame (a data frame conforming to the CAN protocol) under a predetermined condition after transmitting the error frame in order to appropriately control the reception error counter of the authorized ECU. The transmitting unit 120 provides the information in the frame to the communication control unit 3002 and controls the communication control unit 3002. Thus, the transmitting unit 120 can achieve transmission of a frame on the bus 200.

Examples of the operation regarding the process performed by the invalidity detection ECU 100 when the invalidity detection ECU 100 detects an unauthorized frame are described below. For example, the invalidity detection ECU 100 can perform the operation according to each of the operation examples by using the arithmetic unit 3001 (the CPU) executing the control program corresponding to each of the processes. Note that each of the examples of the operation described below is merely illustrative. For example, the invalidity detection ECU 100 may combine some of the processing procedures in the plurality of operation examples below and execute the combined processing procedure.

1.8 First Example of Operation Performed by Invalidity Detection ECU

Figure 7:
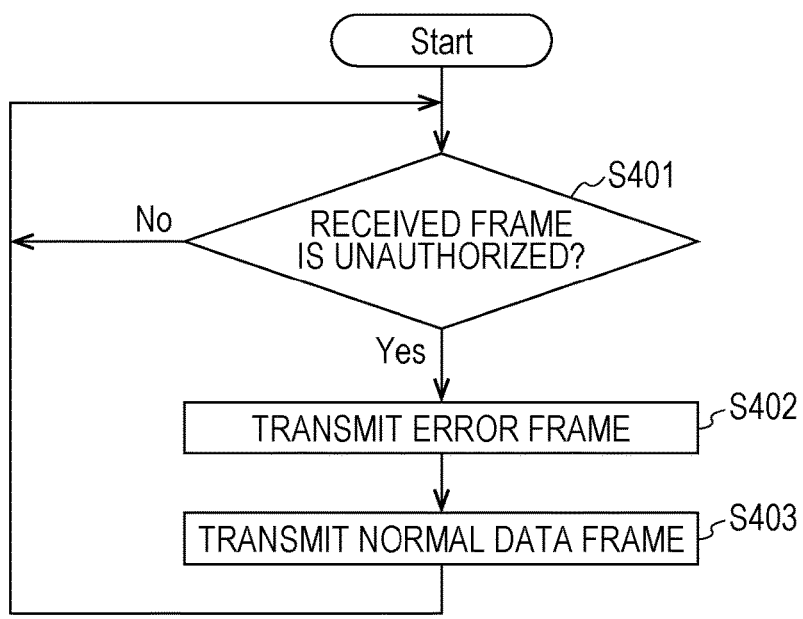
FIG. 7 is a flowchart illustrating a first example of the operation performed by the invalidity detection ECU according to the first embodiment.

FIG. 7 is a flowchart illustrating the processing procedure according to a first example of the operation performed by the invalidity detection ECU 100 according to the present embodiment. The first example of operation is described below with reference to FIG. 7.

As illustrated in FIG. 7, the invalidity detection ECU 100 monitors a frame flowing on the bus 200 and determines whether the frame received by the receiving unit 110 is an unauthorized frame by using the invalidity determination unit 121 first (step S401). That is, the invalidity detection ECU 100 monitors a frame for which transmission on the bus 200 is started from one of the ECUs by receiving the frame bit by bit and determines whether the frame conforms to the determination rule. The determination as to whether the frame conforms to the determination rule is the same as the determination as to whether the frame meets a predetermined condition indicating invalidity (the condition in which the frame does not conform to the determination rule). For example, the unauthorized ECU 2001 can transmit a data frame that conforms to the CAN protocol and that meets the predetermined condition indicating invalidity (not conforming to the determination rule). An unauthorized data frame transmitted by the unauthorized ECU 2001 can be determined as an unauthorized frame in step S401. Through the determination made in step S401, an unauthorized frame that does not conform to the determination rule (that is, an unauthorized frame that meets the predetermined condition indicating invalidity) can be detected. If an unauthorized frame is not detected, the processing in step S401 is repeated.

However, if an unauthorized frame is detected, the invalidity detection ECU 100 transmits an error frame by using the transmitting unit 120 etc. (step S402). Transmission of the error frame is performed at a point in time before the tail end of the unauthorized frame is transmitted. Thus, at least part of the unauthorized frame is overwritten by the error frame on the bus 200 so that the unauthorized frame is invalidated. Accordingly, by transmitting the error frame, reception of the unauthorized frame and the functional processing corresponding to the unauthorized frame performed by the authorized ECU can be prevented. Subsequently, the invalidity detection ECU 100 transmits a normal frame (a normal data frame) in accordance with the CAN protocol by using the transmitting unit 120 etc. (step S403). Transmission of the normal frame in step S403 is performed when, for example, the bus 200 enters the idle state (bus idle) for the first time after the error frame is transmitted in step S402. Transmission of the normal frame in step S403 is not necessarily performed at the moment when the bus 200 enters the bus idle state for the first time. However, to reduce the adverse effect on the authorized ECU caused by the error frame (an increase in the reception error counter), it is effective that transmission of a normal frame is promptly performed. When the invalidity detection ECU 100 transmits the error frame in step S402 to invalidate the unauthorized frame and if the unauthorized ECU 2001 immediately repeats transmission of an unauthorized data frame, the invalidity detection ECU 100 may transmit another error frame. Thereafter, the invalidity detection ECU 100 may transmit a normal frame when, for example, the bus enters the idle state.

1.9 Effect of First Example of Operation

In the first example of operation according to the present embodiment, when inhibiting transmission of an unauthorized frame (invalidating the unauthorized frame) by using an error frame, the invalidity detection ECU 100 subsequently transmits a normal data frame. Since the invalidity detection ECU 100 detects an unauthorized frame and transmits an error frame, it is obvious that the problem arises in the sending node that has transmitted the unauthorized frame, not in the receiving node. Accordingly, the normal frame is transmitted to prevent an increment of the reception error counter. In this manner, the reception error counter of the authorized ECU is decremented. That is, an unnecessary increment of the reception error counter of the authorized ECU is prevented by transmitting the normal frame from the invalidity detection ECU 100 after transmission of the error frame. Thus, the authorized ECU is less likely to enter the passive mode. As a result, restriction of the operation performed by the authorized ECU due to the error frame for invalidating the unauthorized frame can be prevented.

1.10 Second Example of Operation Performed by Invalidity Detection ECU

Figure 8:
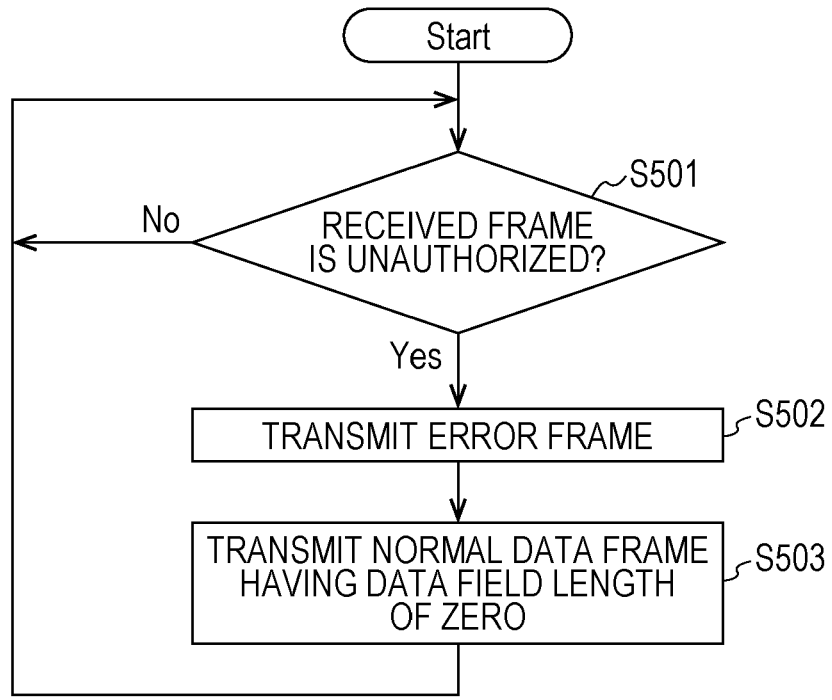
FIG. 8 is a flowchart illustrating a second example of the operation performed by the invalidity detection ECU according to the first embodiment.

FIG. 8 is a flowchart illustrating a processing procedure for the second example of the operation performed by the invalidity detection ECU 100 according to the present embodiment. The second example of the operation is described below with reference to FIG. 8.

The invalidity detection ECU 100 monitors a frame flowing on the bus 200 and determines whether the frame received by the receiving unit 110 is an unauthorized frame by using the invalidity determination unit 121 (step S501). If an unauthorized frame is not detected, the process in step S501 is repeated. However, if an unauthorized frame that does not conform to the determination rule is detected, the invalidity detection ECU 100 transmits an error frame by using the transmitting unit 120 etc. (step S502). Note that steps S501 and S502 are the same as steps S401 and S402 described above, respectively.

Subsequently, the Invalidity detection ECU 100 transmits a normal data frame having a data field length of 0 (zero) by using the transmitting unit 120 etc. (step S503). The normal data frame having a data field length of 0 is a data frame that conforms to the CAN protocol and that does not include data in the data field, that is, a data frame having a DLC value of 0. Note that transmission of the normal data frame having a data field length of 0 in step S503 is performed when, for example, the bus 200 enters the bus idle state for the first time after the error frame is transmitted in step S502.

1.11 Effect of Second Example of Operation

In the second example of the operation according to the present embodiment, if the invalidity detection ECU 100 blocks an unauthorized frame from being transmitted (invalidates the unauthorized frame) using an error frame, the invalidity detection ECU 100 thereafter transmits a normal data frame. In this manner, an unnecessary increment of the reception error counter of the authorized ECU can be prevented and, thus, the authorized ECU can be less likely to enter the passive state. As a result, it can be prevented that the operation performed by the authorized ECU is restricted due to the error frame for invalidating the unauthorized frame. Furthermore, since the normal data frame transmitted by the invalidity detection ECU 100 to decrement the reception error counter of the authorized ECU has a data field length of 0, the bus occupation time of the transmitted normal data frame is short and, thus, the impact of transmission of the normal frame on the bus bandwidth is reduced.

1.12 Third Example of Operation Performed by Invalidity Detection ECU

Figure 9:
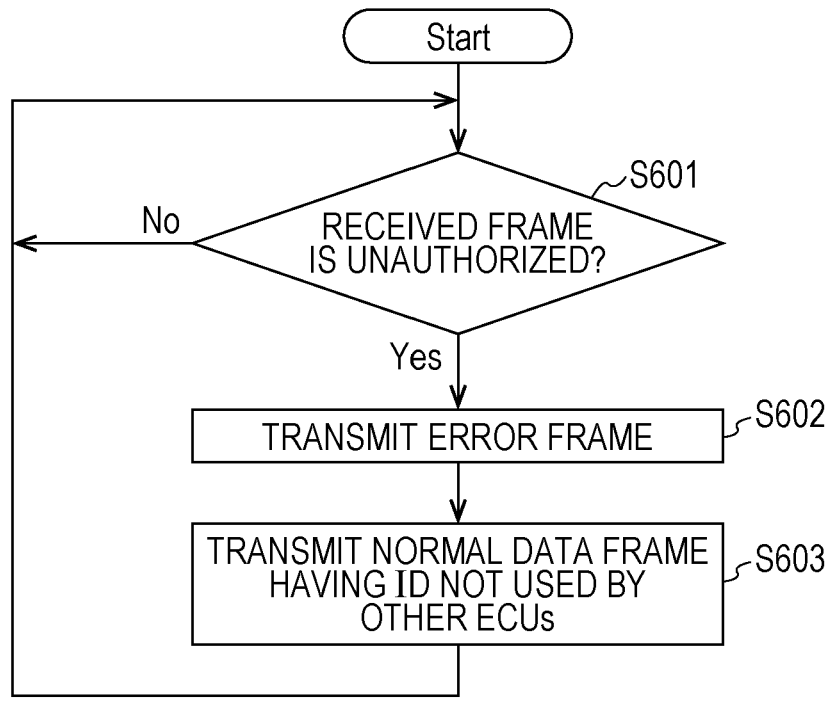
FIG. 9 is a flowchart illustrating a third example of the operation performed by the invalidity detection ECU according to the first embodiment.

FIG. 9 is a flowchart illustrating a processing procedure for the third example of the operation performed by the invalidity detection ECU 100 according to the present embodiment. The third example of the operation is described below with reference to FIG. 9.

The invalidity detection ECU 100 monitors a frame flowing on the bus 200 and determines whether the frame received by the receiving unit 110 is an unauthorized frame by using the invalidity determination unit 121 (step S601). If an unauthorized frame is not detected, the process in step S601 is repeated. However, if an unauthorized frame that does not conform to the determination rule is detected, the invalidity detection ECU 100 transmits an error frame by using the transmitting unit 120 etc. (step S602). Note that steps S601 and S602 are the same as the above-described steps S401 and S402, respectively.

Subsequently, the invalidity detection ECU 100 transmits a normal data frame having an ID (a message ID) which is not used by other ECUs by using the transmitting unit 120 etc. (step S603). The message ID that is not used by other ECUs is a message ID for which a process to be performed by any ECU other than the invalidity detection ECU 100 (the ECUs 400*a* to 400*d*) connected to the bus 200 in the in-vehicle network system 10 after identifying the message ID is not defined. For example, when any ECU connected to the bus 200 other than the invalidity detection ECU 100 does not transmit a data frame having a message ID of 0x200 and if upon receiving a data frame having a message ID of 0x200, the ECU does not perform functional processing corresponding to the data frame, the invalidity detection ECU 100 transmits a normal data frame having a message ID of 0x200 in step S603. It is effective that the normal data frame transmitted in step S603 has a data field length is 0. However, the data field length may not necessarily be 0. Note that the transmission of the normal data frame in step S603 is performed when, for example, the bus 200 enters the bus idle state for the first time after the error frame is transmitted in step S602.

1.13 Effect of Third Example of Operation

In the third example of the operation according to the present embodiment, if the invalidity detection ECU 100 blocks an unauthorized frame from being transmitted (invalidates the unauthorized frame) using an error frame, the invalidity detection ECU 100 thereafter transmits a normal data frame. In this manner, an unnecessary increment of the reception error counter of the authorized ECU can be prevented and, thus, the authorized ECU can be less likely to enter the passive state. As a result, it can be prevented that the operation performed by the authorized ECU is restricted due to the error frame for invalidating the unauthorized frame. Furthermore, since the message ID of the normal data frame transmitted by the invalidity detection ECU 100 to decrement the reception error counter of the authorized ECU is a message ID not used by other ECUs, an unwanted operation performed by an authorized ECU that has received the normal data frame can be prevented.

1.14 Fourth Example of Operation Performed by Invalidity Detection ECU

Figure 10:
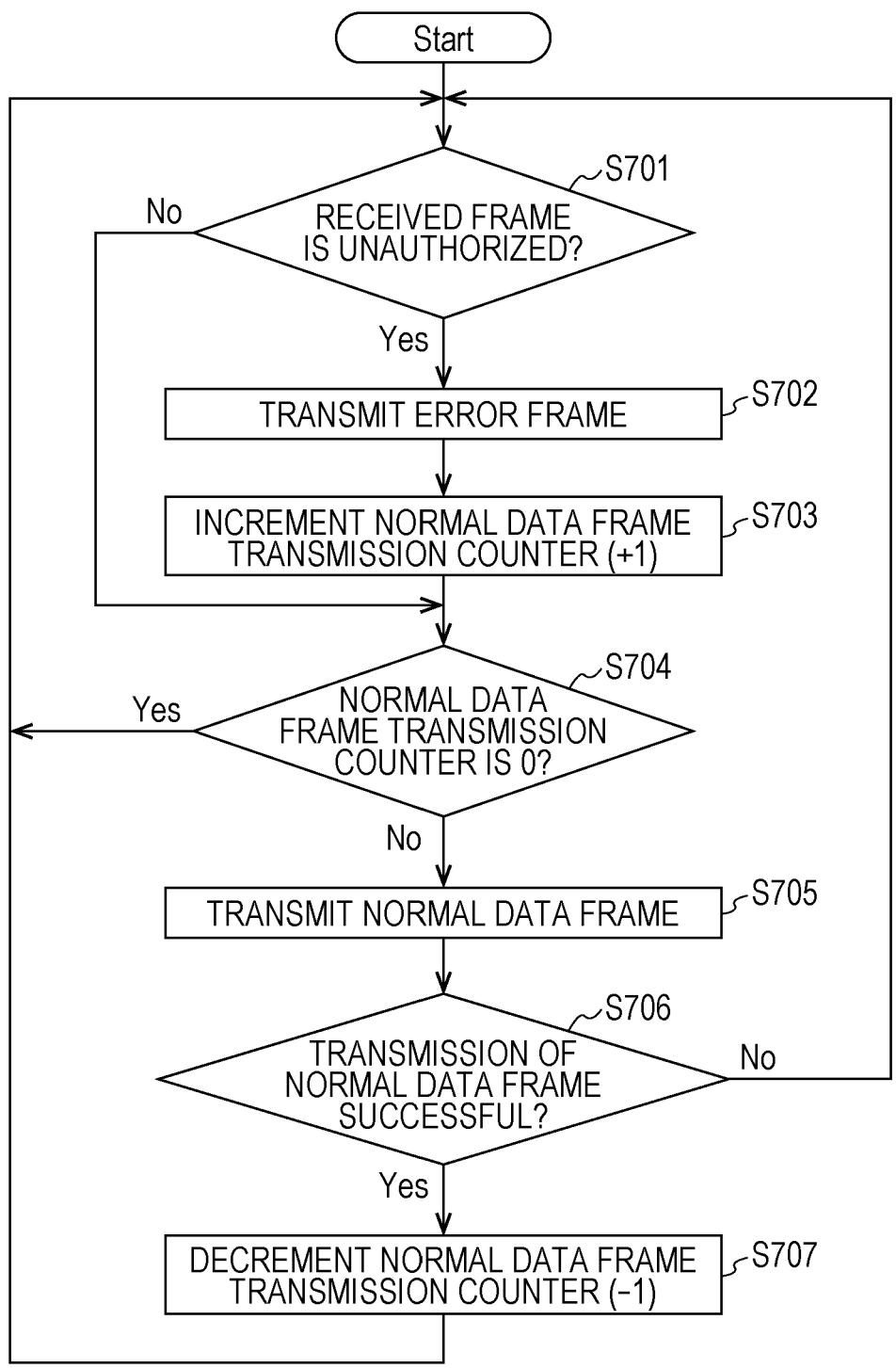
FIG. 10 is a flowchart illustrating a fourth example of the operation performed by the invalidity detection ECU according to the first embodiment.

FIG. 10 is a flowchart illustrating a processing procedure for the fourth example of the operation performed by the invalidity detection ECU 100 according to the present embodiment. The fourth example of the operation is described below with reference to FIG. 10.

The invalidity detection ECU 100 monitors a frame flowing on the bus 200 and determines whether the frame received by the receiving unit 110 is an unauthorized frame by using the invalidity determination unit 121 (step S701). That is, the invalidity detection ECU 100 receives the frame for which transmission on the bus 200 is started bit by bit to monitor the frame. In this manner, the invalidity detection ECU 100 determines whether the frame conforms to the determination rule (whether the frame meets the predetermined condition indicating invalidity). Thus, an unauthorized frame that does not conform to the determination rule (that is, a frame that meets the predetermined condition indicating invalidity) can be detected. However, if, in step S701, an unauthorized frame is not detected, the processes in steps S702 and S703 are skipped and the processing proceeds to step S704.

If, in step S701, an unauthorized frame is detected, the invalidity detection ECU 100 transmits an error frame by using the transmitting unit 120 etc. (step S702). The transmission of the error frame is performed at a point in time before the tail end of the unauthorized frame is transmitted. Thus, at least part of the unauthorized frame is overwritten by the error frame on the bus 200 so that the unauthorized frame is invalidated. Accordingly, by transmitting the error frame, it can be prevented that the unauthorized frame is received and the functional processing corresponding to the unauthorized frame is performed by the authorized ECU. Subsequently, the invalidity detection ECU 100 adds one to a normal data frame transmission counter, which is a counter used to control normal data frame transmission, (increments the normal data frame transmission counter by one) (step S703). The normal data frame transmission counter is used to transmit a number of normal frames equal in number to the number of transmitted error frames. The initial value of the normal data frame transmission counter is 0 (zero). Every time an error frame is transmitted, the normal data frame transmission counter is incremented by one. Every time a normal frame is successfully transmitted, the normal data frame transmission counter is decremented by one.

After step S703 or if an unauthorized frame is not detected in step S701, the invalidity detection ECU 100 checks the value of the normal data frame transmission counter (step S704). If the value is 0, the processing of the invalidity detection ECU 100 proceeds to step S701.

If, in step S704, the value of the normal data frame transmission counter is not 0, the invalidity detection ECU 100 transmits a normal data frame by using the transmitting unit 120 etc. (step S705). Transmission of a normal data frame in step S705 is performed by transmitting a normal data frame bit by bit to the bus 200 that is in a bus idle state. The invalidity detection ECU 100 determines whether the transmission of the normal data frame is successful (step S706). In step S706, another ECU may transmit a data frame at the same time as transmission of the normal data frame for which bit-by-bit transmission on the bus 200 is started in step S705. Accordingly, it is determined whether the transmission was successful as a result of communication arbitration of CAN etc. The determination as to whether the transmission was successful is made by determining whether, for example, the bit value of the transmitted normal data frame is the same as the bit value appearing on the bus 200. Alternatively, for example, the determination may be made by determining whether the ACK slot for the transmitted normal data frame that has appeared on the bus 200 is dominant. Note that the determination as to whether the transmission was successful may be made by, for example, the arithmetic unit (the CPU) 3001 of the invalidity detection ECU 100 receiving, from the communication control unit (CAN controller) 3002, a transmission completion notification that can indicate whether the transmission was successful or not. If, in step S706, it is determined that the transmission of the normal data frame was successful, the invalidity detection ECU 100 subtracts one from the normal data frame transmission counter (decrements the normal data frame transmission counter by one) (step S707). Thereafter, the processing proceeds to step S701.

If, in step S706, it is determined that transmission of the normal data frame was unsuccessful due to, for example, lost arbitration (that is, the transmission has failed), the invalidity detection ECU 100 skips step S707 and proceeds to step S701. As a result, when the transmitting unit 120 of the invalidity detection ECU 100 fails to transmit the normal data frame, the normal data frame is transmitted again. When the invalidity detection ECU 100 transmits an error frame in step S702 to invalidate an unauthorized frame and if, for example, the unauthorized ECU 2001 immediately repeats the transmission of an unauthorized data frame, the normal data frame transmitted by the invalidity detection ECU 100 in step S705 may lose communication arbitration against the unauthorized data frame. Even in such a case, the invalidity detection ECU 100 can transmit a normal data frame in accordance with the normal data frame transmission counter at any point in time.

1.15 Effect of Fourth Example of Operation

In the fourth example of operation according to the present embodiment, if the invalidity detection ECU 100 blocks an unauthorized frame from being transmitted (invalidates the unauthorized frame) using an error frame, the invalidity detection ECU 100 thereafter transmits a normal data frame. In this manner, an unnecessary increment of the reception error counter of the authorized ECU can be prevented and, thus, the authorized ECU can be less likely to enter the passive state. As a result, it can be prevented that the operation performed by the authorized ECU is restricted due to the error frame for invalidating the unauthorized frame. Furthermore, the invalidity detection ECU 100 transmits a number of normal data frames equal in number to the number of the transmitted error frames by using the normal data frame transmission counter. In this manner, even when a normal data frame cannot be temporarily transmitted due to, for example, lost communication arbitration, it can be ensured that a normal data frame is to be transmitted to decrement the reception error counter of the authorized ECU. Thus, it can be prevented that the operation performed by the authorized ECU is restricted due to the error frame for invalidating the unauthorized frame.

1.16 Fifth Example of Operation Performed by Invalidity Detection ECU

Figure 11:
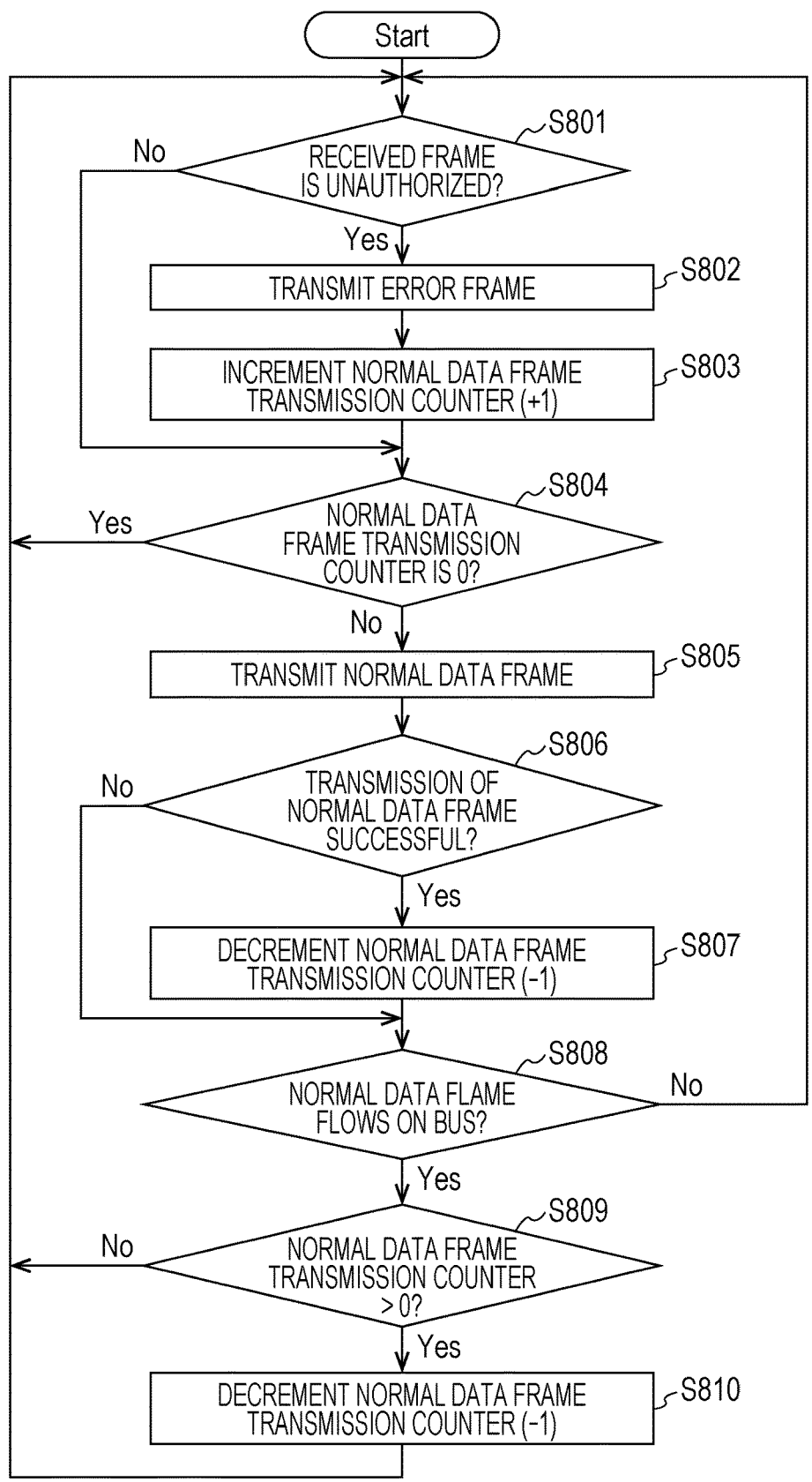
FIG. 11 is a flowchart illustrating a fifth example of the operation performed by the invalidity detection ECU according to the first embodiment.

FIG. 11 is a flowchart illustrating a processing procedure for the fifth example of the operation performed by the invalidity detection ECU 100 according to the present embodiment. The fifth example of the operation is described below with reference to FIG. 11.

The invalidity detection ECU 100 monitors a frame flowing on the bus 200 and determines whether the frame received by the receiving unit 110 is an unauthorized frame by using the invalidity determination unit 121 (that is, whether the frame meets the predetermined condition indicating invalidity) (step S801). If an unauthorized frame is not detected in step S801, steps S802 and S803 are skipped and the processing proceeds to step S804.

If, in step S801, an unauthorized frame is detected, the invalidity detection ECU 100 transmits an error frame by using the transmitting unit 120 etc. (step S802). Subsequently, the invalidity detection ECU 100 adds one to the normal data frame transmission counter, which is a counter for transmission management of a normal data frame, (increments the normal data frame transmission counter by one) (step S803).

After step S803 or if an unauthorized frame is not detected in step S801, the invalidity detection ECU 100 checks the value of the normal data frame transmission counter (step S804). If the value is 0, the processing of the invalidity detection ECU 100 proceeds to step S801.

If, in step S804, the value of the normal data frame transmission counter is not 0, the invalidity detection ECU 100 transmits a normal data frame by using the transmitting unit 120 etc. (step S805). Subsequently, the invalidity detection ECU 100 determines whether the transmission of the normal data frame was successful (step S806). If, in step S806, the invalidity detection ECU 100 determines that the transmission of the normal data frame was successful, the invalidity detection ECU 100 subtracts one from the normal data frame transmission counter (decrements the normal data frame transmission counter by one) (step S807). Thereafter, the processing proceeds to step S808.

If, in step S806, it is determined that transmission of the normal data frame was unsuccessful due to, for example, lost arbitration, the invalidity detection ECU 100 skips step S807 and proceeds to step S808.

Note that steps S801, S802, S803, S804, S805, S806, and S807 are similar to the above-described steps S701, S702, S703, S704, S705, S706, and S707, respectively.

After step S807 or if, in step S806, it is determined that transmission of the normal data frame was unsuccessful, the invalidity detection ECU 100 examines (determines) whether a normal data frame has flowed on the bus 200 (step S808). More specifically, in step S808, the invalidity detection ECU 100 determines whether it has received, from the bus 200, a normal data frame that conforms to the CAN protocol and, thus, is not an unauthorized frame (that is, a frame that does not meet the predetermined condition indicating invalidity). If, in step S808, it is determined that no normal data frame has flowed on the bus 200, the processing skips steps S809 and S810 and proceeds to step S801.

If, in step S808, it is determined that a normal data frame has flowed on the bus 200 and if the normal data frame transmission counter is greater than 0 (step S809), the invalidity detection ECU 100 subtracts one from the normal data frame transmission counter (decrements the normal data frame transmission counter by one) (step S810). Thereafter, the processing proceeds to step S801. This normal data frame transmission counter is used to transmit normal data frames which are more in number than a value obtained by subtracting from the number of transmitted error frames the number of normal data frames that are not unauthorized frames and that are received from the bus 200 after the error frame is transmitted. The initial value of the normal data frame transmission counter is 0. In general, the normal data frame transmission counter is incremented when an error frame is transmitted and is decremented when transmission of a normal data frame is successful or when another ECU transmits a normal data frame onto the bus 200.

1.17 Effect of Fifth Example of Operation

In the fifth example of the operation according to the present embodiment, if the invalidity detection ECU 100 blocks an unauthorized frame from being transmitted (invalidates the unauthorized frame) using an error frame, the invalidity detection ECU 100 thereafter transmits a normal data frame. In this manner, an unnecessary increment of the reception error counter of the authorized ECU can be prevented and, thus, the authorized ECU can be less likely to enter the passive state. As a result, it can be prevented that the operation performed by the authorized ECU is restricted due to the error frame for invalidating the unauthorized frame. Furthermore, the invalidity detection ECU 100 causes a number of normal data frames equal in number to the number of the transmitted error frames to flow on the bus 200 by using the normal data frame transmission counter. In this manner, even when a normal data frame cannot be temporarily transmitted due to, for example, lost communication arbitration, it can be ensured that a normal data frame is to be transmitted to decrement the reception error counter of the authorized ECU. Thus, it can be prevented that the operation performed by the authorized ECU is restricted due to the error frame for invalidating the unauthorized frame. In addition, to decrement the reception error counter of the authorized ECU, the invalidity detection ECU 100 decreases the number of normal data frames to be transmitted therefrom by the number of the data frames that have flowed on the bus 200. In this manner, the bus occupation time of the normal data frames transmitted to decrement the reception error counter of the authorized ECU is short and, thus, the impact of transmission of the normal frame on the bus bandwidth is reduced.

1.18 Sixth Example of Operation Performed by Invalidity Detection ECU

Figure 12:
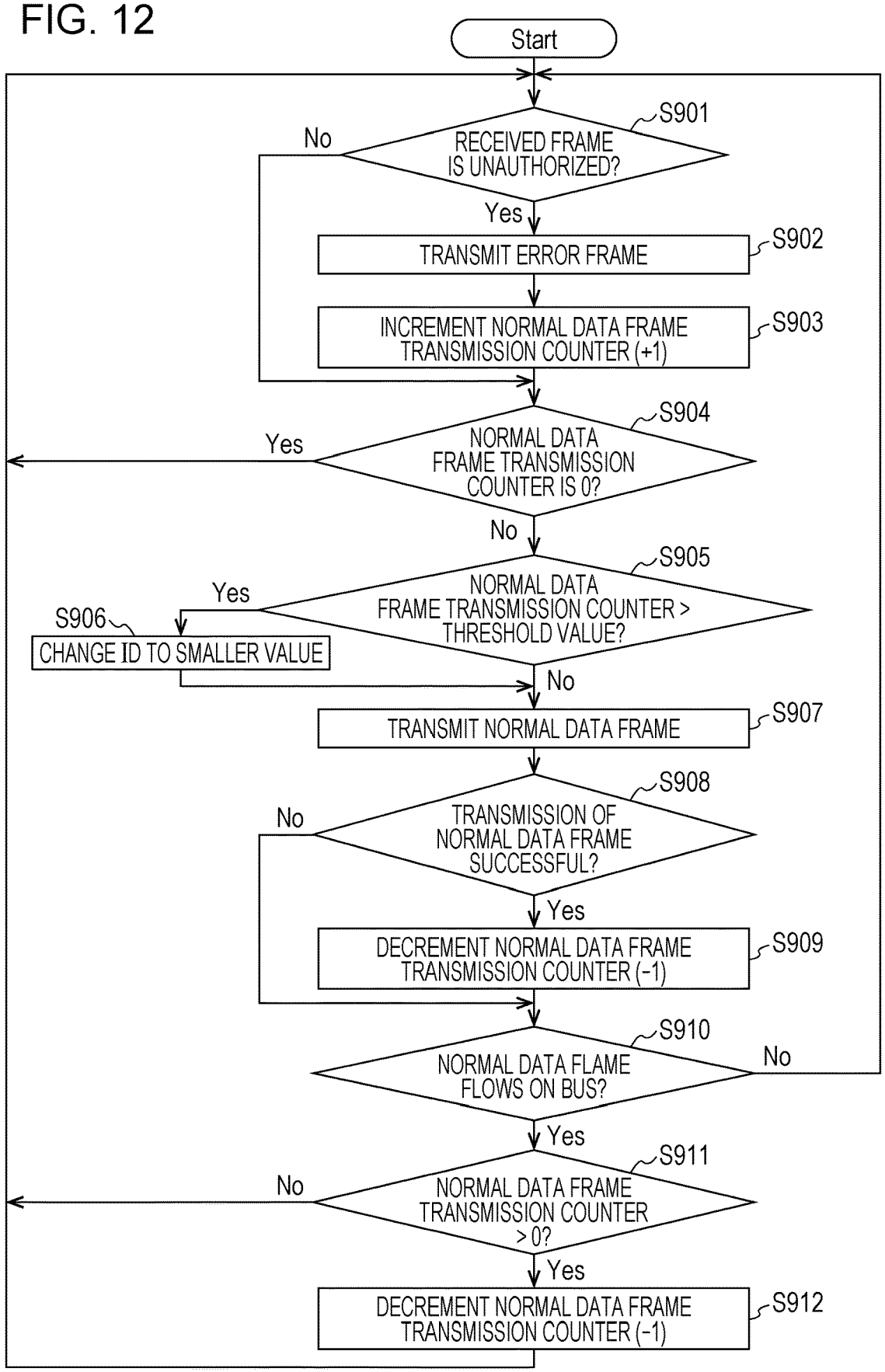
FIG. 12 is a flowchart illustrating a sixth example of the operation performed by the invalidity detection ECU according to the first embodiment.

FIG. 12 is a flowchart illustrating a processing procedure for the sixth example of the operation performed by the invalidity detection ECU 100 according to the present embodiment. The sixth example of the operation is described below with reference to FIG. 12.

The invalidity detection ECU 100 monitors a frame flowing on the bus 200 and determines whether the frame received by the receiving unit 110 is an unauthorized frame by using the invalidity determination unit 121 (that is, whether the frame meets the predetermined condition indicating invalidity) (step S901). If, in step S901, an unauthorized frame is not detected, steps S902 and S903 are skipped and the processing proceeds to step S904.

If, in step S901, an unauthorized frame is detected, the invalidity detection ECU 100 transmits an error frame by using the transmitting unit 120 etc. (step S902). Subsequently, the invalidity detection ECU 100 adds one to the normal data frame transmission counter, which is a counter for transmission management of the normal data frame, (increments the normal data frame transmission counter by one) (step S903).

After step S903 or if, in step S901, an unauthorized frame is not detected, the invalidity detection ECU 100 checks the value of the normal data frame transmission counter (step S904). If the value is 0, the processing of the invalidity detection ECU 100 proceeds to step S901.

If, in step S904, the value of the normal data frame transmission counter is not 0 and if the value of the normal data frame transmission counter is greater than the threshold value (step S905), the invalidity detection ECU 100 changes the value of a message ID to be set in the ID field of a normal data frame to be transmitted in step S907 to a smaller value (step S906). In CAN, the priority of the communication arbitration on the bus increases with decreasing value of the message ID. The initial value of the normal data frame transmission counter is 0, and the threshold value is a predetermined value of 0 or greater. For example, the threshold value may be 0, 1, or 5. If the threshold value is 0, the message ID used for a normal data frame when transmission of the normal data frame fails can be changed to a smaller value. In addition, when transmission of a normal data frame fails, the message ID used for the normal data frame may be changed to a message ID having a higher priority under a certain condition (for example, under a condition in which a threshold value is 1 or greater). For example, as the initial value of the message ID of the normal data frame, a message ID having a relatively high priority in the CAN communication arbitration range where the priority is relatively low. In contrast, when, for example, the transmission has fails due to, for example, lost communication arbitration and, thus, the number of normal data frames to be transmitted increases, the message ID is changed to have a higher priority (that is, the value of the message ID is changed to a smaller value) in the process of step S906.

When, in step S905, the value of the normal data frame transmission counter is not greater than the threshold value or after step S906, the invalidity detection ECU 100 transmits a normal data frame by using the transmitting unit 120 etc. (step S907).

Subsequently, the invalidity detection ECU 100 determines whether the transmission of the normal data frame is successful (step S908). If, in step S908, it is determined that the transmission of the normal data frame is successful, the invalidity detection ECU 100 subtracts one from the normal data frame transmission counter (decrements the normal data frame transmission counter by one) (step S909). Thereafter, the processing proceeds to step S910.

If, in step S908, it is determined that transmission of the normal data frame was unsuccessful due to, for example, lost communication arbitration, the invalidity detection ECU 100 skips step S909 and proceeds to step S910.

After step S909 or if, in step S908, it is determined that transmission of a normal data frame was unsuccessful, the invalidity detection ECU 100 examines (determines) whether a normal data frame has flowed on the bus 200 (step S910). If, in step S910, it is determined that no normal data frame has flowed on the bus 200, steps S911 and S912 are skipped and the processing proceeds to step S901.

If, in step S910, it is determined that a normal data frame has flowed on the bus 200 and if the normal data frame transmission counter is greater than 0 (step S911), the invalidity detection ECU 100 subtracts one from the normal data frame transmission counter (decrements the normal data frame transmission counter by one) (step S912). Thereafter, the processing proceeds to step S901.

Note that steps S901 to S904 and steps S907 to S912 are the same as the above-described steps S801 to S804 and steps S805 to S810, respectively. In addition, in step S906, the invalidity detection ECU 100 may change the message ID in the normal data frame to be transmitted, which has been changed to a smaller value, to the initial value at some timing (for example, when the normal data frame transmission counter reaches 0).

1.19 Effect of Sixth Example of Operation

In the sixth example of the operation according to the present embodiment, if the invalidity detection ECU 100 blocks an unauthorized frame from being transmitted (invalidates the unauthorized frame) using an error frame, the invalidity detection ECU 100 thereafter transmits a normal data frame. In this manner, an unnecessary increment of the reception error counter of the authorized ECU can be prevented and, thus, the authorized ECU can be less likely to enter the passive state. As a result, it can be prevented that the operation performed by the authorized ECU is restricted due to the error frame for invalidating the unauthorized frame. Furthermore, the invalidity detection ECU 100 causes a number of normal data frames equal in number to the number of the transmitted error frames to flow on the bus 200 by using the normal data frame transmission counter. In this manner, even when a normal data frame cannot be temporarily transmitted due to, for example, lost communication arbitration, it can be ensured that a normal data frame is to be transmitted to decrement the reception error counter of the authorized ECU. Thus, it can be prevented that the operation performed by the authorized ECU is restricted due to the error frame for invalidating the unauthorized frame. In addition, to decrement the reception error counter of the authorized ECU, the invalidity detection ECU 100 decreases the number of normal data frames to be transmitted therefrom by the number of the data frames that have flowed on the bus 200. In this manner, the bus occupation time of the normal data frames transmitted to decrement the reception error counter of the authorized ECU is short and, thus, the impact of transmission of the normal frames on the bus bandwidth is reduced. In addition, if the normal data frame transmission counter exceeds a predetermined threshold value, the invalidity detection ECU 100 increases the priority of the normal data frame to be transmitted to decrement the reception error counter of the authorized ECU. Thus, by transmitting a normal data frame using a message ID having a low priority first, the impact on communication performed by another ECU can be reduced. Thereafter, if the normal data frame transmission counter exceeds the predetermined threshold value, the message ID used for the normal data frame is changed to one having a higher priority so as to negligibly lose communication arbitration. In this way, it can be ensured that the reception error counter of the authorized ECU is decremented.

Second Embodiment

An in-vehicle network system obtained by modifying part of the in-vehicle network system 10 according to the first embodiment is described below.

The in-vehicle network system according to the present embodiment includes an invalidity detection ECU 100a connected to both a bus 200 and a different bus 1200. For example, the ECU 400a described in the first embodiment is connected to the bus 200. The invalidity detection ECU 100a is obtained by modifying part of the invalidity detection ECU 100 described in the first embodiment. The invalidity detection ECU 100a has a function of transmitting an error frame upon detecting an unauthorized frame. In addition, the invalidity detection ECU 100a has a forward function of forwarding a data frame between the buses.

2.1 Configuration of Invalidity Detection ECU

Figure 13:
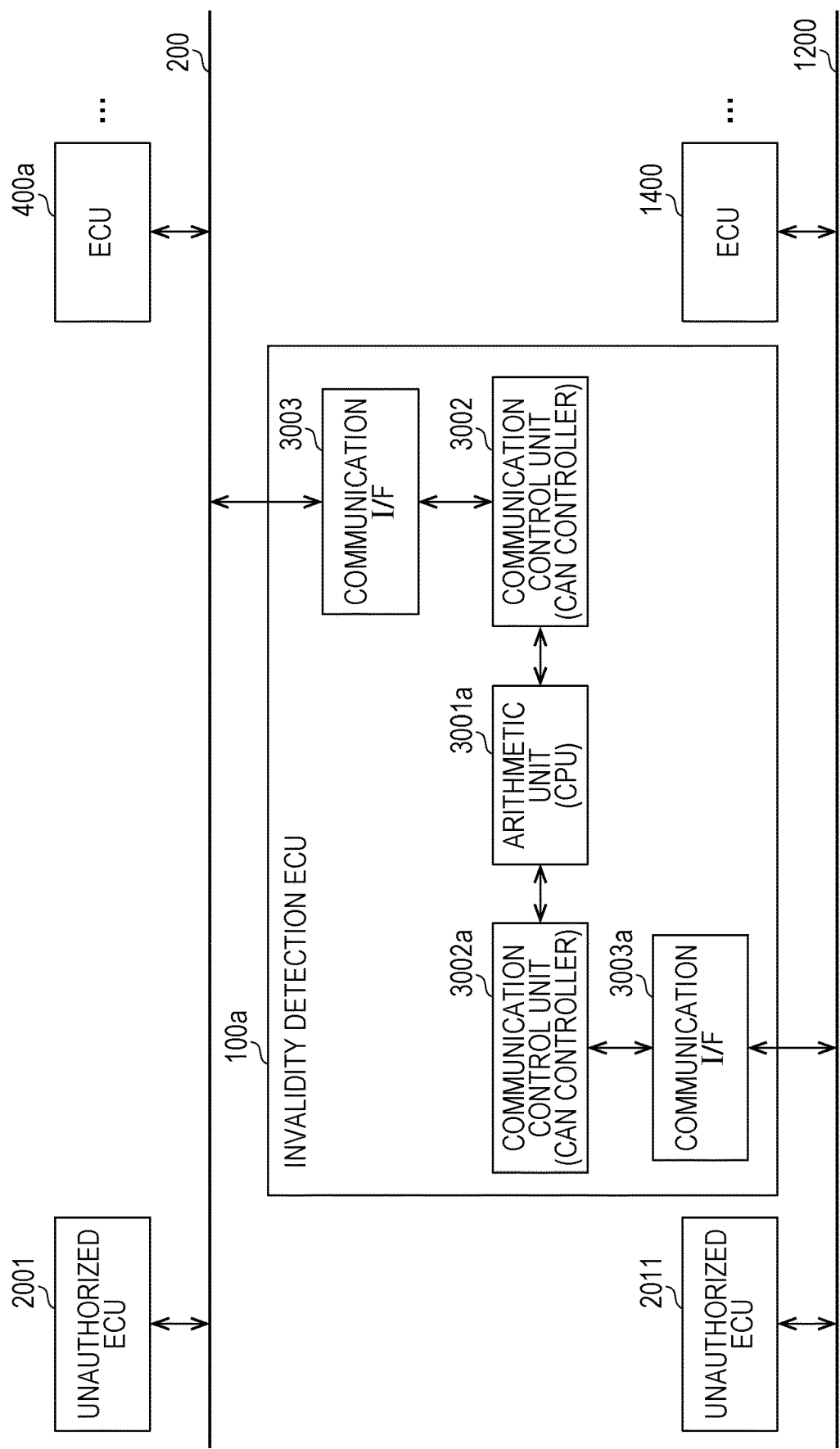
FIG. 13 is a configuration diagram of an invalidity detection ECU according to a second embodiment.

FIG. 13 is a configuration diagram illustrating an example of the configuration of the invalidity detection ECU 100a and the like. In FIG. 13, in addition to the bus 200 illustrated in FIG. 5 and the ECU 400a and the unauthorized ECU 2001 connected to the bus 200, the bus 1200, an authorized ECU 1400 and an unauthorized ECU 2011 connected to the bus 1200, and the invalidity detection ECU 100a connected to both the bus 200 and the bus 1200 are illustrated. The authorized ECU 1400 has a configuration and functions that are the same as those of the ECU 400a described in the first embodiment. Note that the unauthorized ECU 2011 is an ECU that transmits an unauthorized data frame because, for example, the ECU 2011 malfunctions or the ECU 2011 is controlled by an attacker.

The invalidity detection ECU 100a has a function of transmitting a data frame and an error frame in accordance with the CAN protocol, monitoring the bus 200, and blocking transmission of an unauthorized data frame if the unauthorized data frame flows on the bus 200 (that is, invalidating the unauthorized data frame). In addition, the invalidity detection ECU 100a has a forward function of forwarding a data frame between the bus 200 and the bus 1200 (from one bus to the other bus) under a certain condition. The invalidity detection ECU 100a having such a forward function allows, for example, the authorized ECU 400a connected to the bus 200 and the authorized ECU 1400 connected to the bus 1200 to exchange data frames (messages) therebetween.

On the bus 200, frames in accordance with the CAN protocol are transmitted and received. Similarly, on the bus 1200, frames in accordance with the CAN protocol can be transmitted and received. Note that the protocol used for the communication on the bus 1200 does not necessarily match the protocol used for the communication on the bus 200. For example, the CAN protocol may be used for communication on the bus 200, and the CAN-FD (CAN with Flexible Data Rate) protocol may be used for communication on the bus 1200. In the case where the protocols for both the buses do not match, the invalidity detection ECU 100a may have, for example, a function of performing protocol conversion when a frame is forwarded (a gateway function). Hereinafter, description is given under the assumption that the CAN protocol is used for both the communication on the bus 200 and the communication on the bus 1200.

As illustrated in FIG. 13, the invalidity detection ECU 100a includes an arithmetic unit 3001a, a communication control unit 3002, a communication control unit 3002a, a communication I/F 3003, and a communication I/F 3003a. The arithmetic unit 3001a is configured so as to communicate with the communication control units 3002 and 3002a either wired or wirelessly. The communication control unit 3002 and the communication I/F 3003 are configured so as to communicate with each other either wired or wirelessly. Similarly, the communication control unit 3002a and the communication I/F 3003a are configured so as to communicate with each other either wired or wirelessly. In FIG. 13, the same reference numerals are given to the same constituent elements as those illustrated in FIG. 5, and description of the constituent elements are not repeated. The communication I/F 3003a is, for example, a CAN transceiver which is a communication circuit connected to the CAN bus (the bus 1200) to transmit and receive frames. The communication control unit 3002a is a CAN controller which is a processor that controls communication on the bus 1200 and performs processing relating to the CAN protocol. The communication control unit 3002a has a function of converting information received via the communication I/F 3003a into data that is readable by the arithmetic unit 3001a and a function of transmitting a data frame or an error frame in accordance with the CAN protocol via the communication I/F 3003a in response to an instruction from the arithmetic unit 3001a. In addition, the communication control unit 3002a, which is a CAN controller, includes error counters (a transmission error counter and a reception error counter) and performs an operation on the error counters and control in accordance with the error counters. The arithmetic unit 3001a is formed from a CPU (Central Processing Unit) and a memory. The arithmetic unit 3001a executes a control program stored in the memory by using the CPU so as to control the communication control units 3002 and 3002a. Thus, the arithmetic unit 3001a provides a variety of functions relating to the processing based on the received frame and generation of a frame to be transmitted.

The authorized ECU 400a, the authorized ECU 1400, and the invalidity detection ECU 100a perform, for example, transmission and reception of a data frame related to electronic device control via the bus 200 or the bus 1200.

2.2 Functional Configurations of Invalidity Detection ECU

Figure 14:
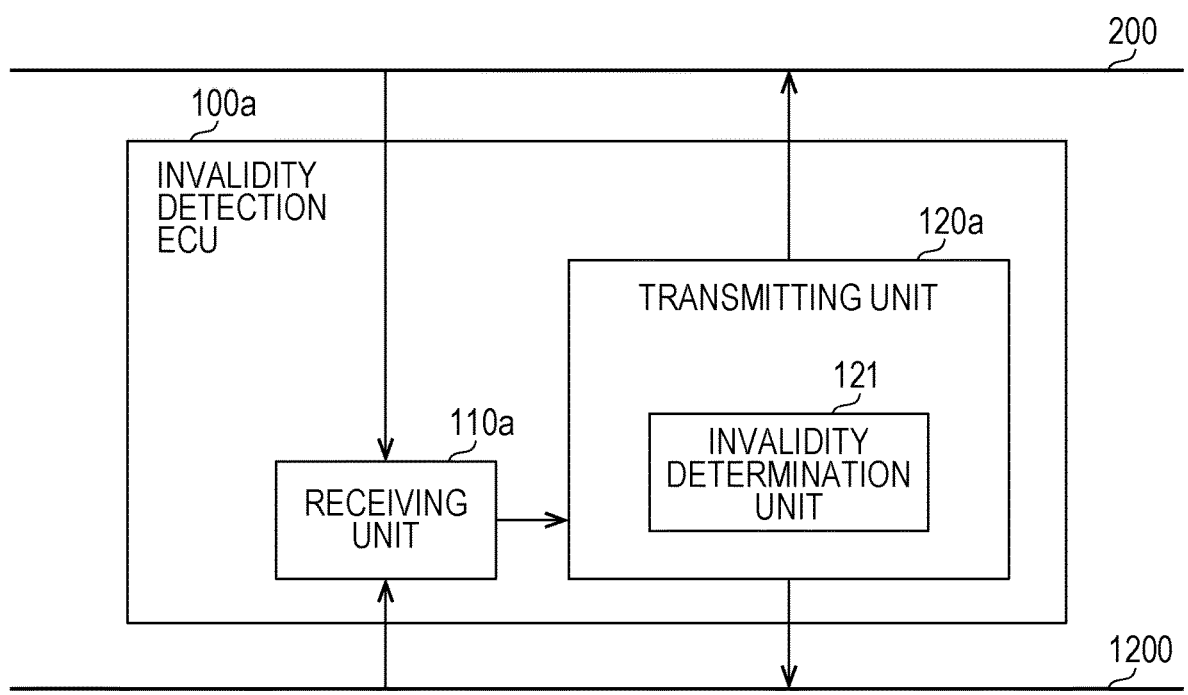
FIG. 14 is a functional block diagram of the invalidity detection ECU according to the second embodiment.

FIG. 14 is a functional block diagram of the invalidity detection ECU 100a.

As functionally illustrated in FIG. 14, the invalidity detection ECU 100a includes a receiving unit 110a and a transmitting unit 120a. The transmitting unit 120a includes an invalidity determination unit 121. The functions of the receiving unit 110a and the transmitting unit 120a are provided by the arithmetic unit 3001a which is a CPU that executes a control program. Note that the invalidity detection ECU 100a may have a variety of functions of a head unit (for example, functions such as car navigation).

The receiving unit 110a has a function of receiving a frame for which transmission on the bus 200 or the bus 1200 is started. The receiving unit 110a reads data relating to a frame received by the communication control unit 3002 or the communication control unit 3002a.

The invalidity determination unit 121 is similar to that illustrated in the first embodiment (refer to FIG. 6). The invalidity determination unit 121 has a function of detecting from the data of the data frame received by the receiving unit 110a whether the data frame is an unauthorized frame. That is, the invalidity determination unit 121 determines whether the data frame conforms to a determination rule predetermined for data frames (determines whether the data frame is unauthorized).

The transmitting unit 120a has the following functions: a function of, when an unauthorized data frame is detected by the invalidity determination unit 121, determining on which one of the bus 200 and the bus 1200 the unauthorized frame has been transmitted and transmitting an error frame on the bus on which the unauthorized frame has been transmitted and a function of transmitting a normal frame (a data frame in accordance with the protocol used for transmission on the bus) promptly after transmitting the error frame under a predetermined condition in order to appropriately control the reception error counter of the authorized ECU. The transmitting unit 120a blocks the transmission of the unauthorized data frame by transmitting an error frame onto the bus to which the unauthorized data frame is transmitted before the tail end of the unauthorized data frame is transmitted (by invalidating the unauthorized data frame). The transmitting unit 120a gives the information in the frame and controls the communication control unit 3002 or the communication control unit 3002a. Thus, the transmitting unit 120a accomplishes the transmission of the frame on the bus 200 or the bus 1200.

An example of the operation related to the process performed by the invalidity detection ECU 100a when the invalidity detection ECU 100a detects an unauthorized frame is described below. For example, the invalidity detection ECU 100a can provide the operation according to the example by using the arithmetic unit (the CPU) 3001a executing the control program.

2.3 Example of Operation Performed by Invalidity Detection ECU

Figure 15:
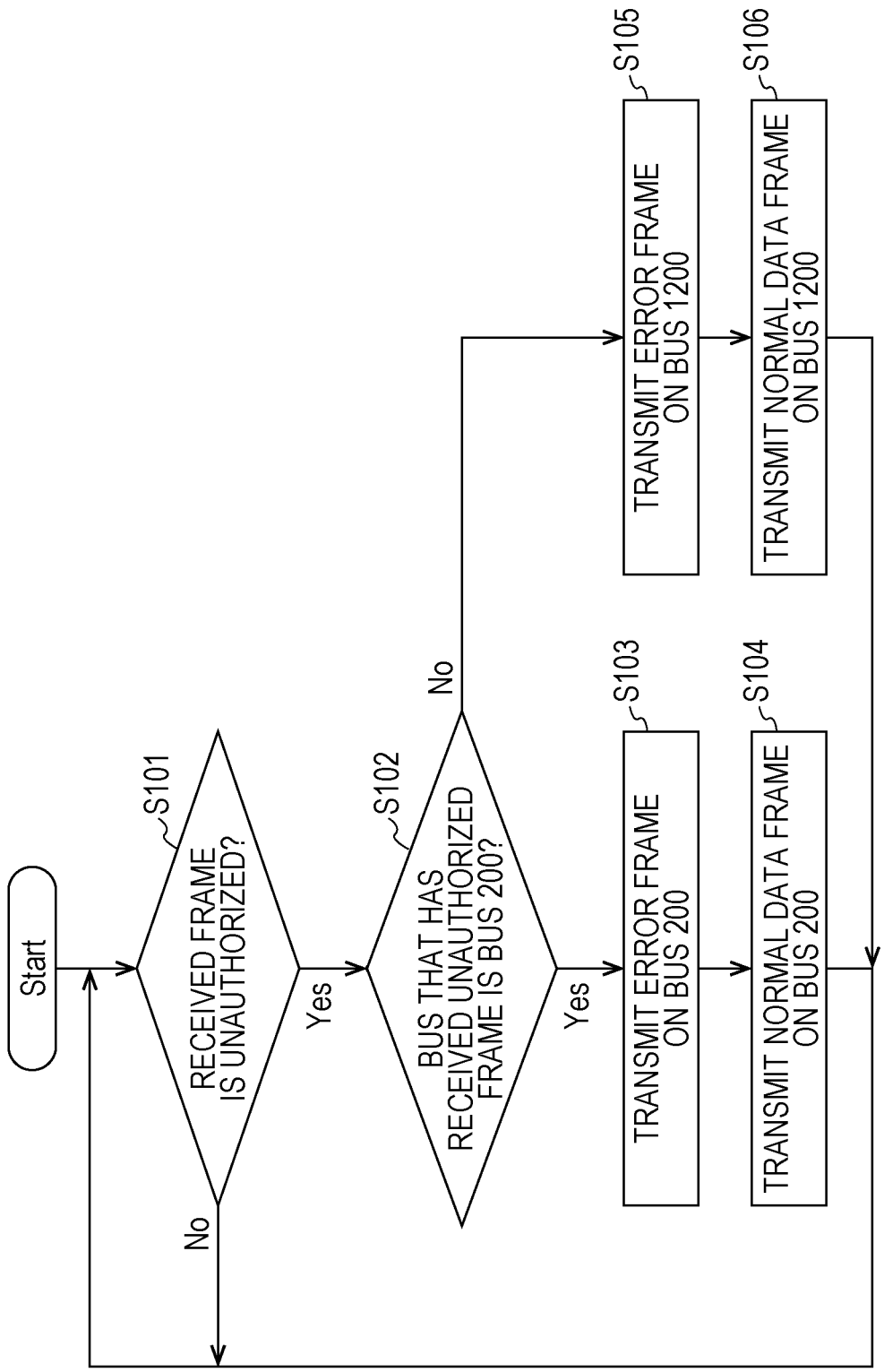
FIG. 15 is a flowchart illustrating an example of the operation performed by the invalidity detection ECU according to the second embodiment.

FIG. 15 is a flowchart illustrating a processing procedure for the example of the operation performed by the invalidity detection ECU 100a according to the present embodiment. The example of the operation performed by the invalidity detection ECU 100a is described below with reference to FIG. 15.

The invalidity detection ECU 100a monitors the frames flowing through the bus 200 and the bus 1200 and determines whether the frame received from one of the bus 200 and the bus 1200 by the receiving unit 110a is an unauthorized frame by using the invalidity determination unit 121 (step S101). That is, the invalidity detection ECU 100a receives a frame for which transmission on the bus 200 or the bus 1200 is started from any one of the ECUs bit by bit and determines whether the frame conforms to the determination rule. The determination as to whether the frame conforms to the determination rule is the same as the determination as to whether the frame meets a predetermined condition indicating invalidity (the condition in which the frame does not conform to the determination rule). In this manner, an unauthorized frame that does not conform to the determination rule (that is, a frame that meets the predetermined condition indicating invalidity) can be detected. If an unauthorized frame is not detected, the processing in step S101 is repeated.

If an unauthorized frame is detected, the Invalidity detection ECU 100a determines on which one of the bus 200 and the bus 1200 the unauthorized frame has been transmitted (step S102).

If, in step S102, it is determined that the unauthorized frame has been transmitted on the bus 200, the invalidity detection ECU 100a transmits an error frame on the bus 200 on which the unauthorized frame has been transmitted by using the transmitting unit 120a etc. (step S103). The transmission of the error frame is performed at a point in time before the tail end of the unauthorized frame is transmitted. Thus, at least part of the unauthorized frame is overwritten by the error frame on the bus 200 so that the unauthorized frame is invalidated. Accordingly, by transmitting the error frame, reception of the unauthorized frame and the functional processing corresponding to the unauthorized frame performed by the authorized ECU 400a can be prevented. Subsequently, the invalidity detection ECU 100a transmits, to the bus 200, a normal frame (a normal data frame) in accordance with the CAN protocol by using the transmitting unit 120 etc. (step S104). The transmission of the normal frame in step S104 is performed when, for example, the bus 200 enters the bus idle state for the first time after the error frame is transmitted to the bus 200 in step S103. Note that transmission of the normal frame in step S104 is not necessarily performed at the moment when the bus 200 enters the bus idle state for the first time. However, to reduce the adverse effect on the authorized ECU caused by the error frame (an increment of the reception error counter), it is effective that transmission of a normal frame is promptly performed.

If, in step S102, it is determined that an unauthorized frame has been transmitted on the bus 1200, the invalidity detection ECU 100a transmits an error frame on the bus 1200 on which the unauthorized frame is being transmitted by using the transmitting unit 120a etc. (step S105). Subsequently, the invalidity detection ECU 100a transmits a normal frame (a normal data frame) in accordance with the CAN protocol to the bus 1200 by using the transmitting unit 120 etc. (step S106). Steps S105 and S106 are similar to steps S103 and S104, respectively, except that the destination bus is the bus 1200. The transmission of the error frame in step S105 is performed at a point in time before the tail end of the unauthorized frame is transmitted. Thus, at least part of the unauthorized frame is overwritten by the error frame on the bus 1200 so that the unauthorized frame is invalidated. Accordingly, by transmitting the error frame, reception of the unauthorized frame and the functional processing corresponding to the unauthorized frame performed by the authorized ECU 1400 or another authorized ECU can be prevented. Note that it is effective that the normal data frame transmitted in step S104 or step S106 has a data field length of 0. However, the data field length may not necessarily be 0. In addition, it is effective that the message ID of the normal data frame transmitted in step S104 or step S106 is a message ID that is not used by other ECUs. Note that a message ID that is not used by other ECUs is a message ID for which a process to be performed in any ECU other than the invalidity detection ECU 100a connected to the bus 200 after identifying the message ID is not defined in the case where, for example, a normal frame is transmitted to the bus 200. Alternatively, in the case where, for example, a normal data frame is transmitted to the bus 1200, a message ID that is not used by other ECUs is a message ID for which a process to be performed by any ECU other than the invalidity detection ECU 100a connected to the bus 1200 after identifying the message ID is not defined.

When the invalidity detection ECU 100a receives a data frame that is not an unauthorized data frame on the bus 200, the invalidity detection ECU 100a can forward the data frame to the bus 1200 on the basis of a predetermined forward rule. Furthermore, when the invalidity detection ECU 100a receives a data frame that is not an unauthorized data frame on the bus 1200, the invalidity detection ECU 100a can forward the data frame to the bus 200 on the basis of a predetermined forward rule. However, upon receiving an unauthorized data frame, the invalidity detection ECU 100a does not forward the data frame.

2.4 Effect of Second Embodiment

According to the present embodiment, when blocking transmission of an unauthorized frame (invalidating the unauthorized frame) by using an error frame, the invalidity detection ECU 100a subsequently transmits a normal data frame. Since the invalidity detection ECU 100a detects an unauthorized frame and transmits an error frame, it is obvious that the problem arises in the sending node that has transmitted the unauthorized frame, not in the receiving node. Accordingly, the normal frame is transmitted to prevent an increment of the reception error counter. In this manner, the reception error counter of the authorized ECU is decremented. That is, an unnecessary increment of the reception error counter of the authorized ECU is prevented by transmitting the normal frame from the invalidity detection ECU 100*a* after transmission of the error frame. Thus, the authorized ECU is less likely to enter the passive mode. As a result, restriction of the operation performed by the authorized ECU due to the error frame for invalidating the unauthorized frame can be prevented. By transmitting the error frame for invalidating the unauthorized frame and the normal data frame for inhibiting an increase in the reception error counter to only the bus having the detected unauthorized frame thereon, the invalidity detection ECU 100*a* can prevent the impact of the unauthorized frame detected on one of the buses on another bus.

Other Embodiments

As described above, while the first and second embodiments have been described as an example of the technology according to the present disclosure, the technology according to the present disclosure is not limited thereto. The technology according to the present disclosure is applicable to an embodiment subjected to a change, replacement, addition, and removal. For example, the modifications described below are also encompassed within the embodiments of the present disclosure.

(1) In the above embodiments, the description has been given with reference to the following example. That is, the transmitting unit 120 of the invalidity detection ECU 100 transmits an error frame on the bus 200 and, subsequently, transmits a normal data frame (a normal frame) to the bus 200. However, if the transmitting unit 120 receives, from the bus 200, a normal frame that does not meet a predetermined condition indicating invalidity at a point in time after the transmission of the error frame and before transmission of a normal frame, the transmitting unit 120 may stop transmitting the normal frame.

(2) In the above embodiments, the data frame of the CAN protocol is described in the standard ID format. However, the data frame may be described in the extended ID format.

(3) While the above embodiments have been described with reference to the example in which the invalidity detection ECU being a head unit, the invalidity detection ECU may be any ECU having an invalidity detection function, and the invalidity detection ECU need not have a function of a head unit.

(4) While the above embodiments have been described with reference to the in-vehicle network system, the invalidity detection ECU 100 or 100*a* described above can be used not only in the in-vehicle network but in any network that connects a plurality of ECUs communicating with one another in accordance with the CAN protocol. For example, the above-described embodiments can be used in a network in which a plurality of ECUs mounted on, for example, industrial machines and robots are connected with one another via a CAN bus.

(5) The above-described CAN protocol may have a broad meaning, encompassing derivative protocols such as Time-Triggered CAN (TTCAN) and CAN-FD (CAN with Flexible Data Rate).

(6) While the above embodiments have been described with reference to the ECUs (including the invalidity detection ECU) being devices each including a digital circuit, such as a processor and a memory, an analog circuit, and a communication circuit, each of the ECU may include another hardware constituent element, such as a hard disk unit, a display, a keyboard, or a mouse. In addition, instead of executing a control program stored in a memory and providing software functions, the functions may be provided by dedicated hardware (e.g., a digital circuit). Note that the constituent elements of each of the ECUs, such as the CPU, the CAN controller, and the CAN receiver, are only examples. A constituent element may be, for example, an integrated circuit made by combining some of the constituent elements or separating the constituent element in any way.

(7) Some or all of the constituent elements that constitute each of the units of the above-described embodiments may be formed from a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI accomplishes the function. In addition, each of units of the constituent elements that constitute each of the devices may be formed as an individual chip, or some or all of the units may be integrated into a single chip. Note that although the term "LSI" is used herein, the terms "IC", "system LSI", "super LSI", or "ultra LSI" may be used as well depending on the level of integration. In addition, the circuit integration is not limited to LSI and may be achieved by dedicated circuitry or a general-purpose processor other than an LSI. A field programmable gate array (FPGA), which is programmable after fabrication of the LSI, or a reconfigurable processor which allows reconfiguration of connections and settings of circuit cells in LSI after fabrication of the LSI may be used. Moreover, should a circuit integration technology replacing LSI appear as a result of advancements in semiconductor technology or other technologies derived flout the technology, the functional blocks could be integrated using such a technology. Another possibility is the application of biotechnology, for example.

(8) Alternatively, some or all of the constituent elements that constitute each of the above-described units may be formed from an IC card or a single module removable from the device. The IC card or the module is a computer system formed from, for example, a microprocessor, a ROM, and a RAM. The IC card or the module may include the above-described super multifunctional LSI. When the microprocessor operates in accordance with the computer program, the IC card or the module provides its function. The IC card or the module may be tamper resistant.

(9) According to another aspect of the present disclosure, a method, such as a communication method for invalidating an unauthorized frame and reducing the impact of the invalidation of an unauthorized frame, for use in the above-described in-vehicle network may be provided. For example, the communication method includes receiving a frame for which transmission on a CAN bus is started and, if the received frame meets a predetermined condition indicating invalidity, transmitting an error frame on the bus before the tail end of the frame is transmitted and, after the error frame is transmitted, transmitting a normal frame, which conforms to the CAN protocol, on the bus. In addition, a computer program that realizes the method by using a computer or a digital signal formed from the computer program may be provided. According to still another aspect of the present disclosure, a computer-readable storage medium, such as a flexible disk, a hard disk, a CD-ROM, an MO, a DVD, a DVD-ROM, a DVD-RAM, a BD (Blu-ray (registered trademark) Disc), or a semiconductor memory, that stores the above-described computer program or digital signal is provided. In addition, the above-described digital signal stored in such a storage medium may be provided. According to yet still another aspect of the present disclosure, the computer program or the digital signal transmitted via an electric communication network, a wireless or wired communication network, a network represented by the Internet, or data broadcasting may be provided. According to yet still another aspect of the present disclosure, a computer system including a microprocessor and a memory is provided. The memory may store the computer program therein, and the microprocessor may operate in accordance with the computer program. Furthermore, the present disclosure may be realized by another independent computer system by recording the program or the digital signal in the storage medium and transferring the storage medium or transferring the program or the digital signal via, for example, the above-mentioned network.

(10) An embodiment achieved by combining the constituent elements and the functions described in the above embodiments and modifications in any way is also encompassed within the scope of the present disclosure.

The present disclosure can be employed for an in-vehicle network system or the like that detects and invalidates an unauthorized frame transmitted on a network.

What is claimed is:

1. An invalidity detection electronic control unit connected to a bus used by a plurality of electronic control units to communicate with one another in accordance with controller area network (CAN) protocol,
   wherein each of the plurality of electronic control units includes a reception error counter, and configured to:
   increment a value of the reception error counter when each of the plurality of electronic control units receives an error frame from the bus, and
   decrement the value of the reception error counter when each of the plurality of electronic control units receives a normal frame from the bus,
   the invalidity detection electronic control unit comprising:
   a receiver that receives a frame for which transmission is started; and
   a transmitter that transmits the error frame on the bus before a tail end of the frame is transmitted if the frame received by the receiver meets a predetermined condition indicating invalidity and transmits the normal frame that conforms to the CAN protocol on the bus after the error frame is transmitted.

2. The invalidity detection electronic control unit according to claim 1, further comprising:
   a communication interface connected to the bus;
   a CAN controller connected to the communication interface, the CAN controller controlling communication on the bus in accordance with the CAN protocol; and
   a CPU that controls the CAN controller to realize the receiver and the transmitter.

3. The invalidity detection electronic control unit according to claim 1, wherein when the bus enters an idle state for the first time after the transmission of the error frame, the transmitter transmits the normal frame.

4. The invalidity detection electronic control unit according to claim 1, wherein the transmitter transmits normal frames equal in number to the number of the transmitted error frames.

5. The invalidity detection electronic control unit according to claim 1, wherein the normal frame transmitted by the transmitter after an error frame is transmitted is a data frame having a data field with a length of zero.

6. The invalidity detection electronic control unit according to claim 1, wherein an ID indicated by an ID field of the normal frame transmitted by the transmitter after an error frame is transmitted is an ID for which a process to be performed is not defined by any one of electronic control units connected to the bus other than the invalidity detection electronic control unit after the electronic control unit identifies the ID.

7. The invalidity detection electronic control unit according to claim 1, wherein if the transmitter receives a normal frame that does not meet the predetermined condition from the bus after the transmission of the error frame and before the transmission of the normal frame, the transmitter stops transmitting the normal frame.

8. The invalidity detection electronic control unit according to claim 1, wherein the invalidity detection electronic control unit is connected to a plurality of buses, and the invalidity detection electronic control unit has a function of forwarding a frame received from one of the buses to the other,
   wherein if the received frame meets the predetermined condition, the invalidity detection electronic control unit stops forwarding the frame, and
   wherein if a frame received by the receiver meets the predetermined condition, the transmitter transmits an error frame on the bus from which the frame has been received before the tail end of the frame is transmitted and transmits the normal frame on the bus after the error frame is transmitted.

9. The invalidity detection electronic control unit according to claim 1, wherein the transmitter transmits a normal frame if the transmission of the normal frame fails.

10. The invalidity detection electronic control unit according to claim 9, wherein the transmitter transmits normal frames which are more in number than a value obtained by subtracting, from the number of the transmitted error frames, the number of normal frames that do not meet the predetermined condition and that are received from the bus after the error frames are transmitted.

11. The invalidity detection electronic control unit according to claim 9, wherein if the transmission of the normal frame fails, the transmitter transmits a normal frame having an ID field indicating an ID that is smaller than an ID indicated by an ID field of the normal frame.

12. An in-vehicle network system comprising:
   a plurality of electronic control units that communicate with one another via a bus in accordance with a controller area network (CAN) protocol; and
   an invalidity detection electronic control unit connected to the bus,
   wherein the invalidity detection electronic control unit includes a receiver that receives a frame for which transmission is started and a transmitter that transmits an error frame on the bus before a tail end of the frame is transmitted if the frame received by the receiver meets a predetermined condition indicating invalidity and transmits a normal frame that conforms to the CAN protocol on the bus after the error frame is transmitted,
   wherein each of the plurality of electronic control units includes a CAN controller that includes a reception error counter and that controls communication on the bus in accordance with the CAN protocol, wherein each of the plurality of electronic control units increments a value of the reception error counter when each of the plurality of electronic control units receives an error frame from the bus, and wherein each of the plurality of electronic control units decrements the value of the reception error counter when each of the plurality of electronic control units receives a normal frame from the bus.

13. A communication method for use in an in-vehicle network system including a plurality of electronic control units that communicate with one another via a bus in accordance with a controller area network (CAN) protocol,
   wherein each of the plurality of electronic control units includes a reception error counter, and configured to:
      increment a value of the reception error counter when each of the plurality of electronic control units receives an error frame from the bus, and
      decrement the value of the reception error counter when each of the plurality of electronic control units receives a normal frame from the bus,
   the communication method comprising:
   receiving a frame for which transmission is started; and
   transmitting the error frame on the bus before a tail end of the frame is transmitted if the received frame meets a predetermined condition indicating invalidity and transmitting the normal frame that conforms to the CAN protocol on the bus after the error frame is transmitted.

* * * * *